(12) United States Patent
Kitajima et al.

(10) Patent No.: US 12,404,157 B2
(45) Date of Patent: Sep. 2, 2025

(54) POSITION ESTIMATION SYSTEM, FORKLIFT, POSITION ESTIMATION METHOD, AND PROGRAM

(71) Applicant: Mitsubishi Logisnext Co., Ltd., Nagaokakyo (JP)

(72) Inventors: Katsumasa Kitajima, Tokyo (JP); Yusuke Kinouchi, Tokyo (JP); Masahiro Yamada, Tokyo (JP); Takumi Fujita, Tokyo (JP); Takuya Akashi, Nagaokakyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 177 days.

(21) Appl. No.: 18/380,504

(22) Filed: Oct. 16, 2023

(65) Prior Publication Data

US 2024/0132332 A1   Apr. 25, 2024
US 2024/0228247 A9   Jul. 11, 2024

(30) Foreign Application Priority Data

Oct. 20, 2022   (JP) ................. 2022-168577

(51) Int. Cl.
*B66F 9/075*   (2006.01)
*G06T 7/60*    (2017.01)

(52) U.S. Cl.
CPC .............. *B66F 9/0755* (2013.01); *G06T 7/60* (2013.01); *G06T 2207/30252* (2013.01)

(58) Field of Classification Search
None
See application file for complete search history.

(56) References Cited

U.S. PATENT DOCUMENTS

| 2004/0098146 A1* | 5/2004 | Katae ................. B66F 9/24 340/429 |
| 2023/0273618 A1* | 8/2023 | Thode ................. G05D 1/0272 701/25 |

FOREIGN PATENT DOCUMENTS

| JP | 2018-9918 A    | 1/2018 |
| JP | 2021-120810 A  | 8/2021 |
| JP | 2022-22715 A   | 2/2022 |
| JP | 2022-34861 A   | 3/2022 |

\* cited by examiner

*Primary Examiner* — Lail A Kleinman
(74) *Attorney, Agent, or Firm* — Birch, Stewart, Kolasch & Birch, LLP

(57) ABSTRACT

A position estimation system is a position estimation system for estimating a position of a forklift equipped with a camera and includes: a position estimation unit configured to estimate a position of the forklift on the basis of a feature included in an image captured by the camera; and an inclusion determination unit configured to calculate, on the basis of a position in a height direction of a mast with which the forklift is equipped, an inclusion range indicating a range in which the mast is in the image and determine to stop estimation of the position by using the position estimation unit when the inclusion range calculated exceeds an allowable range.

10 Claims, 21 Drawing Sheets

POSITION ESTIMATION SYSTEM, FORKLIFT, POSITION ESTIMATION METHOD, AND PROGRAM

CROSS-REFERENCE TO RELATED APPLICATIONS

This application claims the benefit of priority to Japanese Patent Application Number 2022-168577 filed on Oct. 20, 2022. The entire contents of the above-identified application are hereby incorporated by reference.

TECHNICAL FIELD

The disclosure relates to a position estimation system, a forklift, a position estimation method, and a program.

RELATED ART

There have been proposed many methods for measuring the position of a mobile body by capturing an image around the mobile body with a camera mounted on the mobile body and detecting a marker or the like included in the captured image. For example, JP 2022-34861 A discloses a system in which a camera whose imaging direction is directed to a ceiling is installed at a forklift and a position of the forklift is estimated by using an image feature of the ceiling. This system mainly images the ceiling as a static structure in the field of view of the camera, thus allowing for robust positioning while minimizing the influence of a dynamic object in an operation environment. However, since a mobile body such as a forklift is not always supplied with power from the outside, it is necessary to reduce power consumption as much as possible. In addition, to reduce the manufacturing cost of the forklift, it is difficult to mount an expensive calculator that can handle a high computational load. However, each image has a large data size, and image processing such as feature point extraction for positioning requires a large computational load and large power consumption.

In addition, in the forklift, a mast is lifted as a fork is lifted, and the mast may be included in a captured image of a ceiling then. Since the range in which the mast is included in the image does not contain information necessary for positioning, power consumption for image processing on this range is wasted. Further, in positioning using an image, a position is generally estimated by comparing map data (environment information) created based on image information captured in the past with a latest image acquired. However, the more objects unrelated to the environment, such as the mast, are included in the image, the more difficult it is to compare with the map data, and the possibility of the decrease in positioning accuracy may increase.

JP 2018-9918 A discloses a self-position estimation device that estimates a self-position of a mobile body from an image obtained by capturing a surrounding environment with a camera mounted at the mobile body. In this self-position estimation device, when a part of the mobile body is included in the angle of view of the camera, a region with such inclusion is deleted from the image, and the self-position is estimated using the remaining region in order to increase estimation accuracy. In the technique described in JP 2018-9918 A, a plurality of images captured at different times is compared with each other, and a region in which a part of a mobile body is included is determined on the basis of a difference between the images.

SUMMARY

Regarding the positioning using an image of a forklift, there is a need for a technique for performing the positioning while reducing the influence of inclusion of a mast and the like.

The disclosure provides a position estimation system, a forklift, a position estimation method, and a program that can solve the above-described problem.

A position estimation system according to the disclosure is a position estimation system for estimating a position of a forklift equipped with a camera and includes: a position estimation unit configured to estimate a position of the forklift on the basis of a feature included in an image captured by the camera; and an inclusion determination unit configured to calculate, on the basis of a position in a height direction of a mast with which the forklift is equipped, an inclusion range indicating a range in which the mast is in the image and determine to stop the estimation of the position by using the position estimation unit when the inclusion range calculated exceeds an allowable range.

A forklift of the disclosure includes a camera and the position estimation system described above.

A position estimation method according to the disclosure is a position estimation method for estimating a position of a forklift equipped with a camera and includes: calculating, on the basis of a position in a height direction of a mast with which the forklift is equipped, an inclusion range indicating a range in which the mast is in an image captured by the camera; determining whether the inclusion range calculated exceeds an allowable range; and determining to stop processing of estimating a position of the forklift on the basis of a feature included in the image captured by the camera when the inclusion range exceeds the allowable range.

A program according to the disclosure causes a computer to execute processing of estimating a position of a forklift equipped with a camera. The processing includes: calculating, on the basis of a position in a height direction of a mast with which the forklift is equipped, an inclusion range indicating a range in which the mast is in an image captured by the camera; determining whether the inclusion range calculated exceeds an allowable range; and determining to stop the processing of estimating a position of the forklift on the basis of a feature included in the image captured by the camera when the inclusion range exceeds the allowable range.

According to the position estimation system, the forklift, the position estimation method, and the program described above, it is possible to perform positioning using an image of the forklift while reducing the influence of inclusion of the mast and the like.

BRIEF DESCRIPTION OF DRAWINGS

The disclosure will be described with reference to the accompanying drawings, wherein like numbers reference like elements.

DESCRIPTION OF EMBODIMENTS

First Embodiment

Hereinafter, image processing on an image used for positioning according to the disclosure will be described with reference to the drawings.

Body Configuration of Forklift

Figure 1:
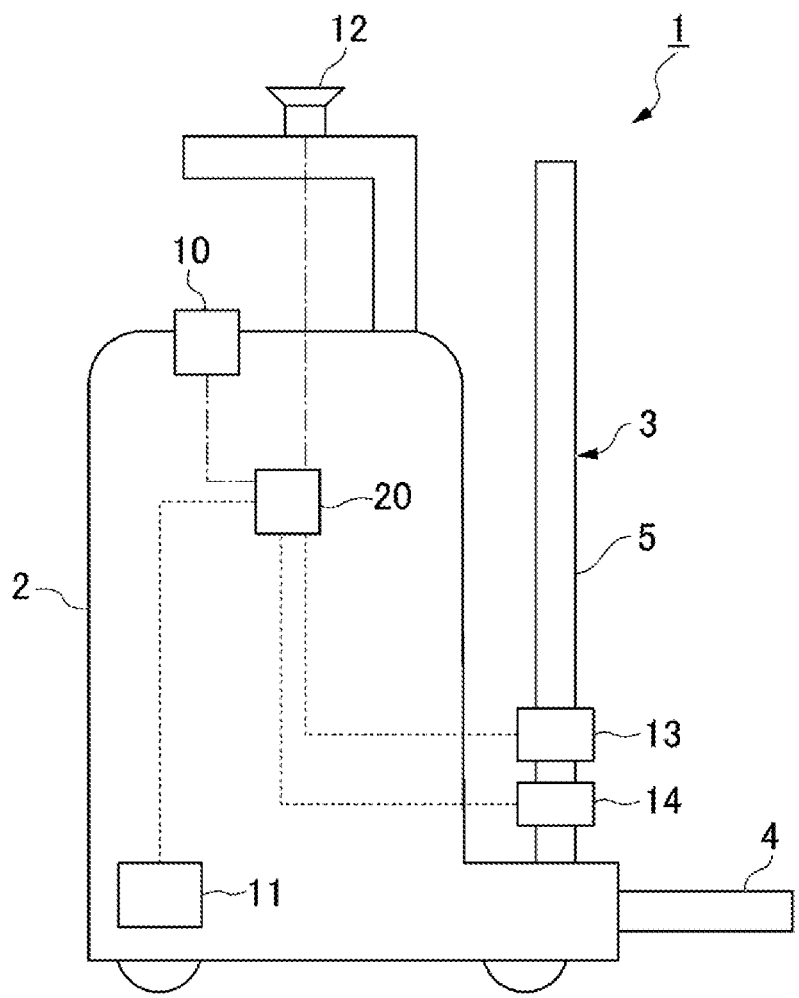
FIG. 1 is a schematic diagram illustrating an example of a forklift according to each embodiment.

FIG. 1 is a schematic diagram illustrating an example of a forklift according to each embodiment.

A forklift 1 includes a vehicle body 2, a cargo handling device 3, and a computation device 20. The vehicle body 2 includes tires, and although not illustrated, a driving device and a steering device, and causes the forklift 1 to travel. The cargo handling device 3 includes a fork 4 and a mast 5 that lifts and lowers the fork 4. The vehicle body 2 is provided with an IMU 10, an encoder 11, and a camera 12. The IMU 10 includes an accelerometer and a gyro sensor, and can detect a moving speed, acceleration, a moving direction, and a turning direction of the forklift 1. The encoder 11 is a rotary encoder that detects the rotational speed of the tires (for example, a rear wheel) of the forklift 1. The movement of the forklift 1 can be detected by a measurement value of the encoder 11. The camera 12 is directed above the vehicle body 2, and always captures images of a ceiling of a work area while the forklift 1 is operating. The cargo handling device 3 is provided with a lifting height sensor 13 and a load sensor 14. The lifting height sensor 13 detects a lifting height position of the fork 4. The load sensor 14 detects the weight of the cargo loaded on the fork 4. The lifting height sensor 13 and the load sensor 14 can detect a cargo handling operation with the cargo handling device 3, a change in a cargo loaded on the fork 4, and the like.

Each sensor of the IMU 10, the encoder 11, the camera 12, a lifting height sensor 13, and a load sensor 14 is connected to the computation device 20, and a measurement value measured by each sensor is sent to the computation device 20. The computation device 20 includes a computer including a processor. The computation device 20 estimates a position (self-position) of the forklift 1 by using the measurement value from each of the sensors described above.

Configuration of Position Estimation System

Figure 2:
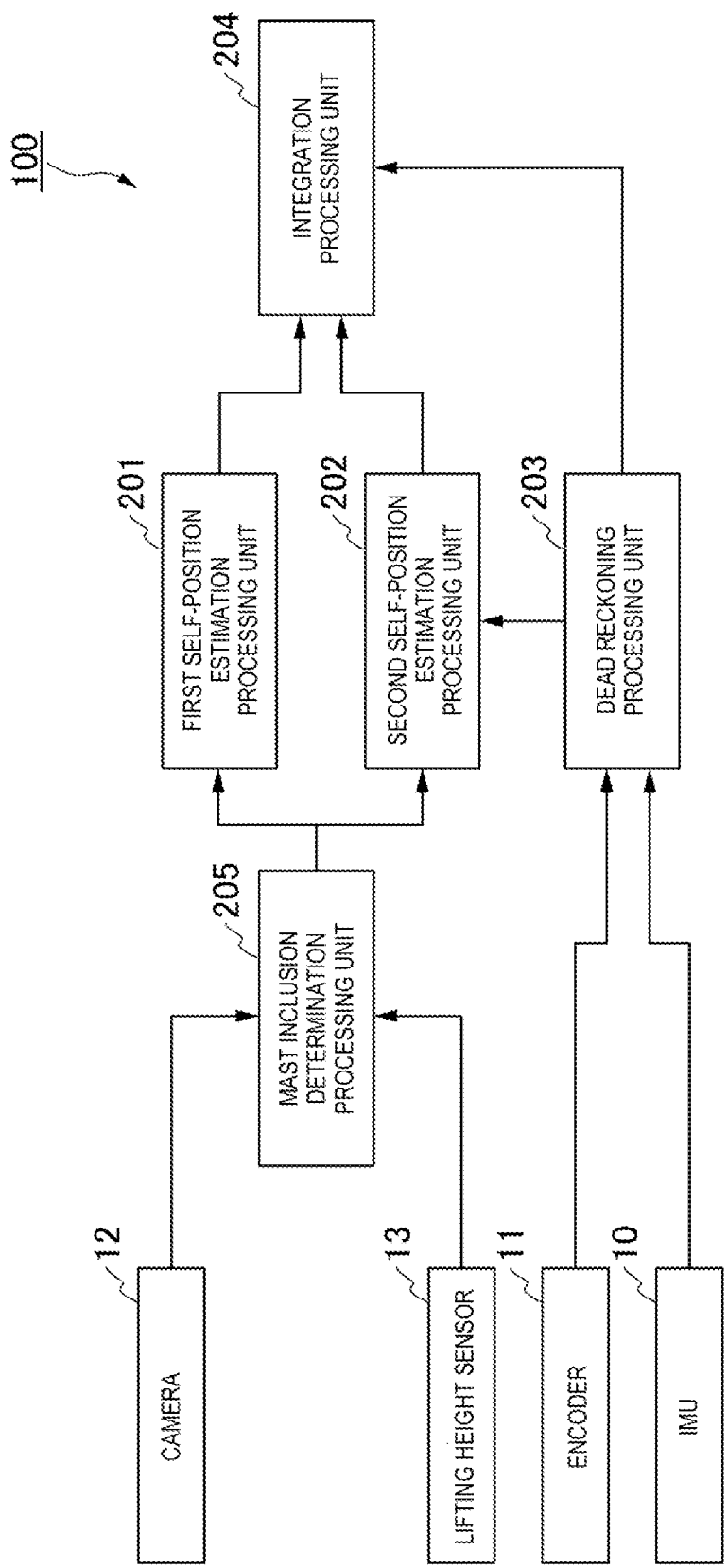
FIG. 2 is a diagram illustrating an example of a position estimation system according to a first embodiment.

FIG. 2 is a diagram illustrating an example of a position estimation system according to the first embodiment.

As illustrated in FIG. 2, a position estimation system 100 includes a first self-position estimation processing unit 201, a second self-position estimation processing unit 202, a dead reckoning processing unit 203, an integration processing unit 204, a mast inclusion determination processing unit 205, the IMU 10, the encoder 11, the camera 12, and the lifting height sensor 13. Among these, the first self-position estimation processing unit 201, the second self-position estimation processing unit 202, the dead reckoning processing unit 203, the integration processing unit 204, and the mast inclusion determination processing unit 205 are functions implemented in the computation device 20.

The first self-position estimation processing unit 201 extracts, from an image captured by the camera 12, feature points having image features (image features indicating a marker or the like) by which a position of the marker or the like on a map (ceiling map) can be determined, and checks the feature points against map data in which the marker or the like in a work area is recorded in advance, thereby estimating a self-position (position of the forklift 1).

While generating a map from the feature points extracted by the first self-position estimation processing unit 201, the second self-position estimation processing unit 202 performs self-position estimation based on features of an image (image features that enable calculation of a relative movement amount by being compared with an image captured at a previous time, but by itself do not enable determination of an absolute position on the map) using a visual simultaneous localization and mapping (V-SLAM) technique.

The dead reckoning processing unit 203 uses measurement values of IMU 10 and the encoder 11 to perform self-position estimation by dead reckoning.

The integration processing unit 204 integrates the self-positions estimated by the first self-position estimation processing unit 201, the second self-position estimation processing unit 202, and the dead reckoning processing unit 203 using a Kalman filter or the like, and outputs a final positioning result of the self-position.

The mast inclusion determination processing unit 205 acquires an image (captured image) captured by the camera 12, geometrically calculates an inclusion range of the mast 5 in the image from a lift amount of the mast 5, an installation position and an angle of view of the camera 12, and the like, and stops self-position estimation processing using an image when the result of the calculation shows that the inclusion range of the mast 5 in the image exceeds an allowable range. When the inclusion range of the mast 5 is within the allowable range, the mast inclusion determination processing unit 205 outputs the captured image to the first self-position estimation processing unit 201 and the second self-position estimation processing unit 202, and instructs the execution of the self-position estimation processing using an image.

Next, processing of calculating an inclusion range of the mast 5 by using the mast inclusion determination processing unit 205 will be described with reference to FIGS. 3A to 3D. FIGS. 3A to 3D are the first to the fourth diagrams illustrating the processing of calculating an inclusion range of the mast according to the first embodiment, respectively.

Figure 3A:
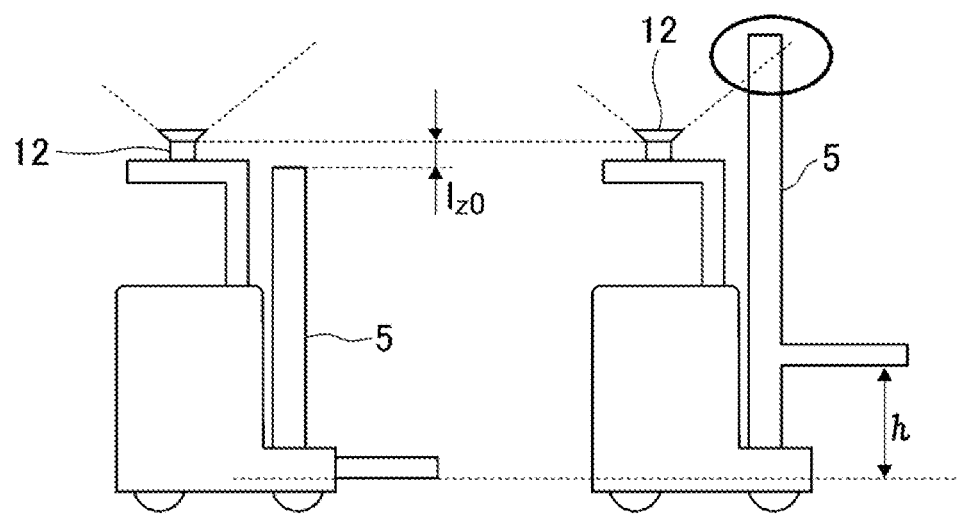
FIG. 3A is the first diagram for explaining processing of calculating a mast inclusion range according to the first embodiment.
Figure 3B:
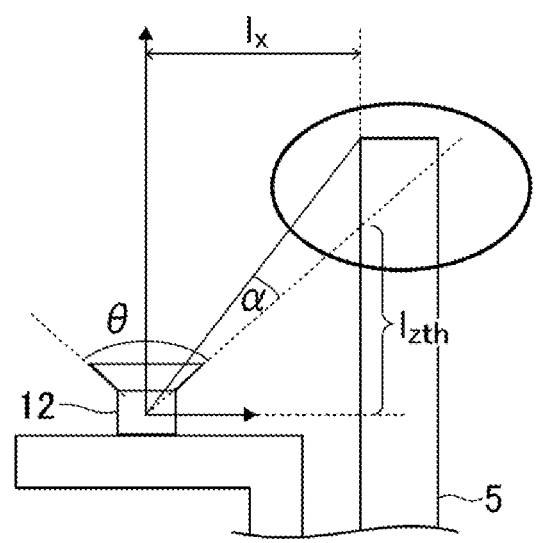
FIG. 3B is the second diagram for explaining the processing of calculating a mast inclusion range according to the first embodiment.

The dashed lines extending from the camera 12 in FIG. 3A indicate an imaging range of the camera 12. While an upper end of the mast 5 is lower than the camera 12 when the fork 4 is not lifted, the mast 5 is included in the imaging range when the fork 4 (mast 5) is lifted as illustrated in the right drawing in FIG. 3A. A distance in a vertical direction between the center of the camera 12 in a height direction and an upper portion of the mast 5 when the fork 4 is not lifted is $l_{z0}$. A lift amount of the fork 4 is h. Further, as illustrated in FIG. 3B, θ is the angle of view of the camera 12, α is an angle at which the mast 5 is included in an imaging range of the camera 12, $l_x$ is a distance in a front-back direction of the vehicle body between the camera 12 and the mast 5, and $l_{zth}$ is a distance in the vertical direction between the camera 12 and the upper portion of the mast 5 at which the mast 5 starts entering the imaging range of the camera 12. Then, Expressions (1) and (2) below are geometrically established.

$$l_{zth} = l_x \cdot \tan(\pi/2) - (\theta/2)) \tag{1}$$

$$\alpha = (\theta/2) - \tan^{-1}(l_x - (h/l_{z0})) \tag{2}$$

A condition under which the mast 5 starts entering the imaging range can be represented by Expression (3) below.

$$h - l_{z0} > l_{zth} \tag{3}$$

Further, an inclusion range of the mast 5 from an end of an image can be represented by Expression (4) below.

$$(\alpha/\theta) \times 100 (\%) \tag{4}$$

Figure 3C:
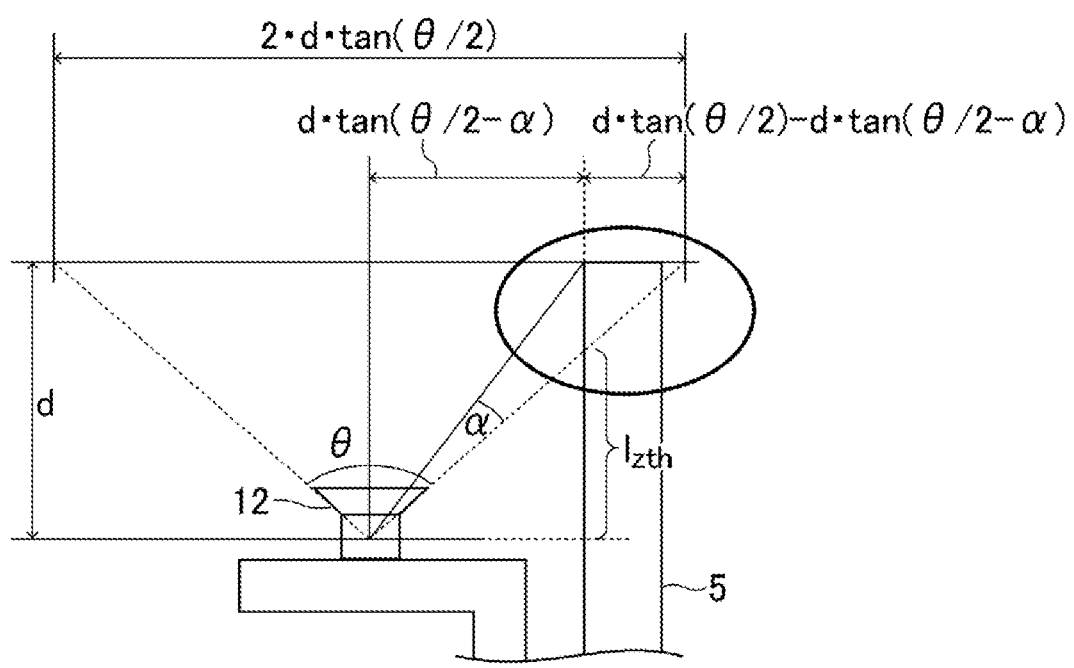
FIG. 3C is the third diagram for explaining the processing of calculating a mast inclusion range according to the first embodiment.

When a distance in the height direction from the center of the camera 12 in the height direction to the upper end of the mast 5 included in the imaging range is defined as d, a width of the imaging range at the distance d and a distance from the center of the imaging range to the mast 5 can be represented by Expressions (5) and (6) below, respectively, as illustrated in FIG. 3C.

$$2 \cdot d \cdot \tan(\theta/2) \tag{5}$$

$$d \cdot \tan(\theta/2 - \alpha) \tag{6}$$

Thus, the inclusion range of the mast 5 from the end of the image can be represented by Expression (7) below.

$$((\tan(\theta/2) - \tan(\theta/2 - \alpha))/2 \cdot \tan(\theta/2)) \times 100 (\%) \tag{7}$$

Figure 3D:
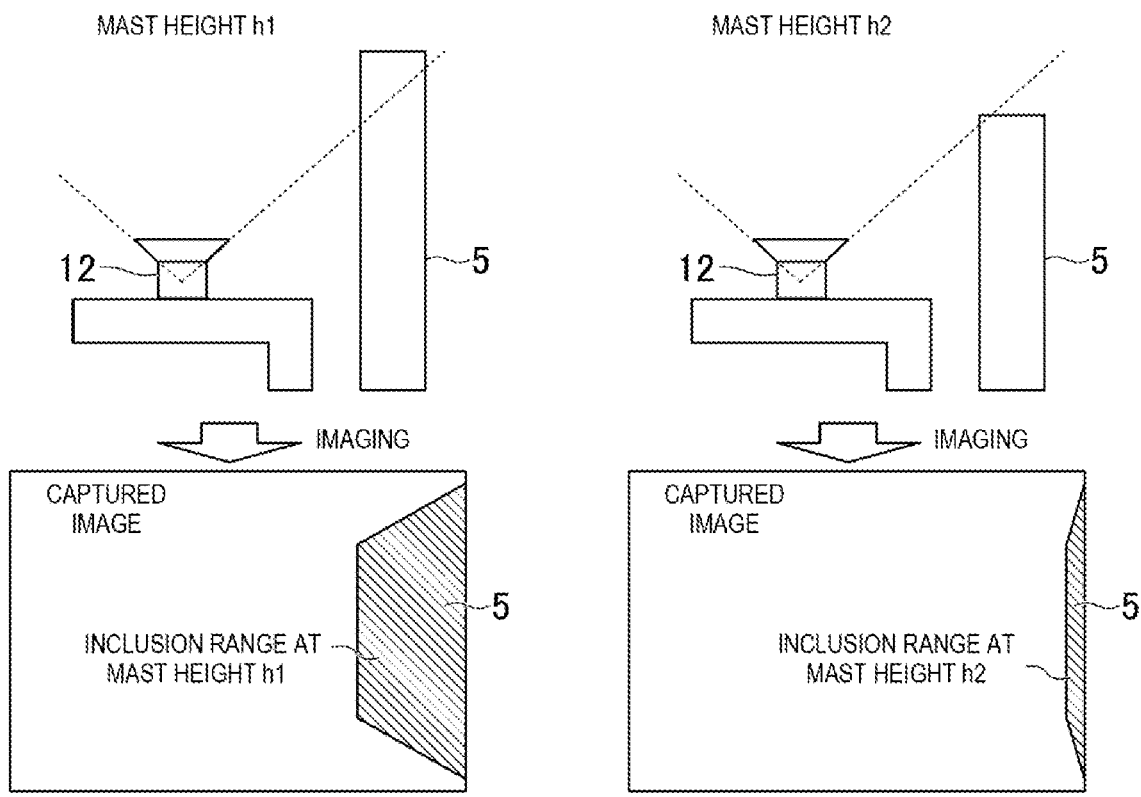
FIG. 3D is the fourth diagram for explaining the processing of calculating a mast inclusion range according to the first embodiment.

As illustrated in FIG. 3D, a range in which the mast 5 is included in the imaging range changes according to the lift amount of the mast 5, and the range can be calculated by Expression (4) or (7) above.

Operation

Figure 4:
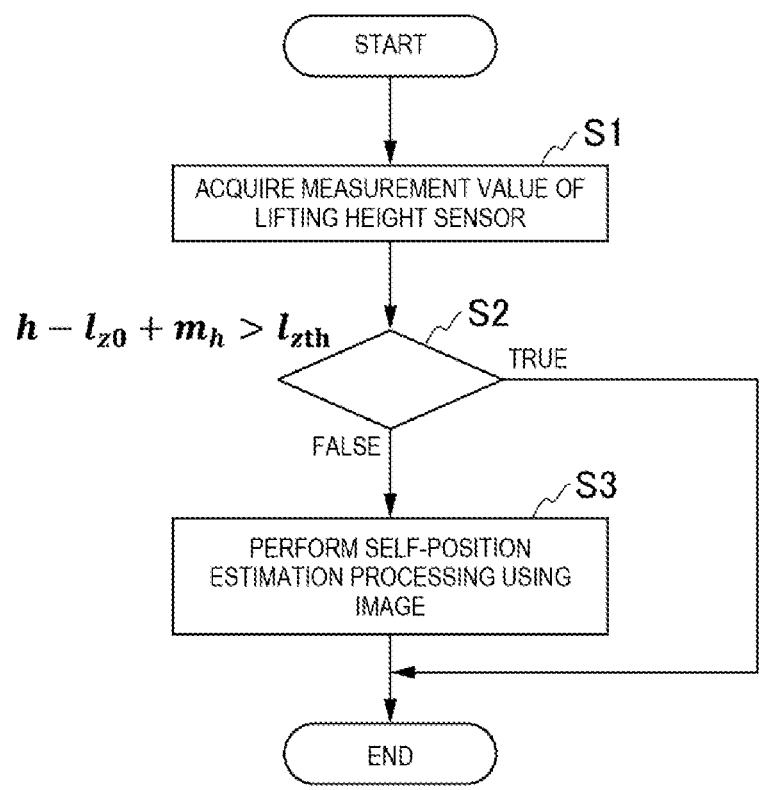
FIG. 4 is a flowchart illustrating an example of positioning processing according to the first embodiment.

Next, a flow of self-position estimation processing using an image in the positioning processing using the position estimation system 100 will be described with reference to FIG. 4. FIG. 4 is a flowchart illustrating an example of positioning processing according to the first embodiment. The position estimation system 100 repeats the following processing at a predetermined control cycle. First, the mast inclusion determination processing unit 205 acquires a measurement value measured by the lifting height sensor 13 (step S1). Next, the mast inclusion determination processing unit 205 determines whether Expression (3') below is satisfied (step S2).

$$h - l_{z0} + m_h > l_{zth} \tag{3'}$$

Here, $m_h$ is a margin related to an inclusion height. A certain margin $m_h$ is provided in consideration of errors in measurement values of the positional relationship between the camera 12 and the mast 5, an inclination of the mast 5, and the like. The values of $l_{z0}$ and $l_{zth}$ in Expression (3') are measured at the time of installation of the camera 12 and thus are known in advance, and these values are recorded in the mast inclusion determination processing unit 205. h can be calculated from the measurement value of the lifting height sensor 13 (difference between before and after the fork 4 is lifted). Satisfying Expression (3') indicates that the mast 5 is highly likely to be included in an image captured by the camera 12, and non-satisfying Expression (3') indicates that the mast 5 is less likely to be included in the image. Specifically, by Expression (3'), it is possible to determine whether the mast 5 is included in the image, that is, whether the inclusion range is larger than 0, more precisely, whether the inclusion range of the mast 5 in the captured image is smaller than a range corresponding to the margin m h of the height of the mast 5, or is equal to or larger than the range corresponding to the margin $m_h$. When Expression (3') is satisfied (step S2; True), the mast inclusion determination processing unit 205 does not instruct the first self-position estimation processing unit 201 and the second self-position estimation processing unit 202 to execute the self-position estimation processing using an image. The self-position estimation processing using an image is self-position estimation processing executed by the first self-position estimation processing unit 201 and the second self-position estimation processing unit 202. When the mast 5 is included in the captured image, the accuracy of self-position estimation is reduced. Thus, when Expression (3') is satisfied, the self-position estimation processing using an image having a high computational load is stopped to prevent the estimation accuracy from being reduced and reduce power consumption. The integration processing unit 204 calculates a final positioning result of a self-position from the positioning result of the dead reckoning processing unit 203. On the other hand, when Expression (3') is not satisfied (step S2; False), the mast inclusion determination processing unit 205 instructs the first self-position estimation processing unit 201 and the second self-position estimation processing unit 202 to execute the self-position estimation processing using an image. The first self-position estimation processing unit 201 and the second self-position estimation processing unit 202 execute the self-position estimation processing (step S3), and output estimation results to the integration processing unit 204. The result of positioning concurrently performed by the dead reckoning processing unit 203 is also output to the integration processing unit 204. The integration processing unit 204 calculates the final positioning result of a self-position from the positioning results of the first self-position estimation processing unit 201, the second self-position estimation processing unit 202, and the dead reckoning processing unit 203.

Effects

In the operation of a manned forklift, the forklift often travels with the forks 4 lifted. Thus, the mast 5 is always included in the image of the camera 12 directed to a ceiling as a stationary object even when the forklift is traveling. There is no need to perform the self-position estimation processing on the image in the range in which the mast 5 is included, and performing the processing will consume unnecessary power. In addition, regarding the positioning accuracy, for example, even though the forklift 1 has been actually moving, an estimation result shows that the forklift 1 has not been moving or the amount of movement is small. Therefore, whether the mast 5 is included in a captured image of the camera 12 is determined by referring to the measurement value of the lifting height sensor 13. When the mast 5 is included, it is determined highly unlikely that an appropriate positioning result can be calculated by the self-position estimation processing using an image, and the positioning processing using the image is stopped. Accordingly, calculation resources can be saved and the decrease in the accuracy of a final positioning result can be prevented.

Second Embodiment

A position estimation system 100A according to a second embodiment of the disclosure will be described below with reference to FIGS. 5 to 7. In the first embodiment, when the mast 5 is in a captured image, the self-position estimation processing using an image is stopped. In this control, since the positioning using the image is stopped when the mast is included, if traveling with the fork 4 lifted is prolonged, only dead reckoning (the longer the traveling distance is, the more the error is accumulated) is available as a positioning means, and the positioning accuracy may decrease. In the positioning using V-SLAM by using the second self-position estimation processing unit 202, the position estimation processing becomes easier when comparison between an image feature of a last captured image and an image feature of an image captured immediately before the last captured image is successfully performed (because if matching with the image captured immediately before the last captured image cannot be performed, matching with environmental information (map) registered in the past is performed, and thus the number of matching targets is increased, and the computational load is increased). Thus, performing the processing successively (without a time interval) as much as possible can reduce the computational load and maintain the positioning accuracy. In addition, even if the mast 5 is in a captured image, there may be a case where image features can be sufficiently extracted and appropriate positioning can be performed, or a case where a marker or the like is included in the image. Thus, when the first self-position estimation processing unit 201 performs the self-position estimation processing using the image excluding the range in which the mast 5 is, it can be expected to avoid the decrease in the positioning accuracy. Therefore, in the second embodiment, the decrease in the positioning accuracy is avoided by determining an inclusion range of the mast in an image in accordance with the positional relationship between the camera and the mast measured at the time of installation of the camera 12, generating an image in which the determined inclusion range is excluded and invalidated, and performing the self-position estimation on the basis of the generated image.

Configuration of Position Estimation System

Figure 5:
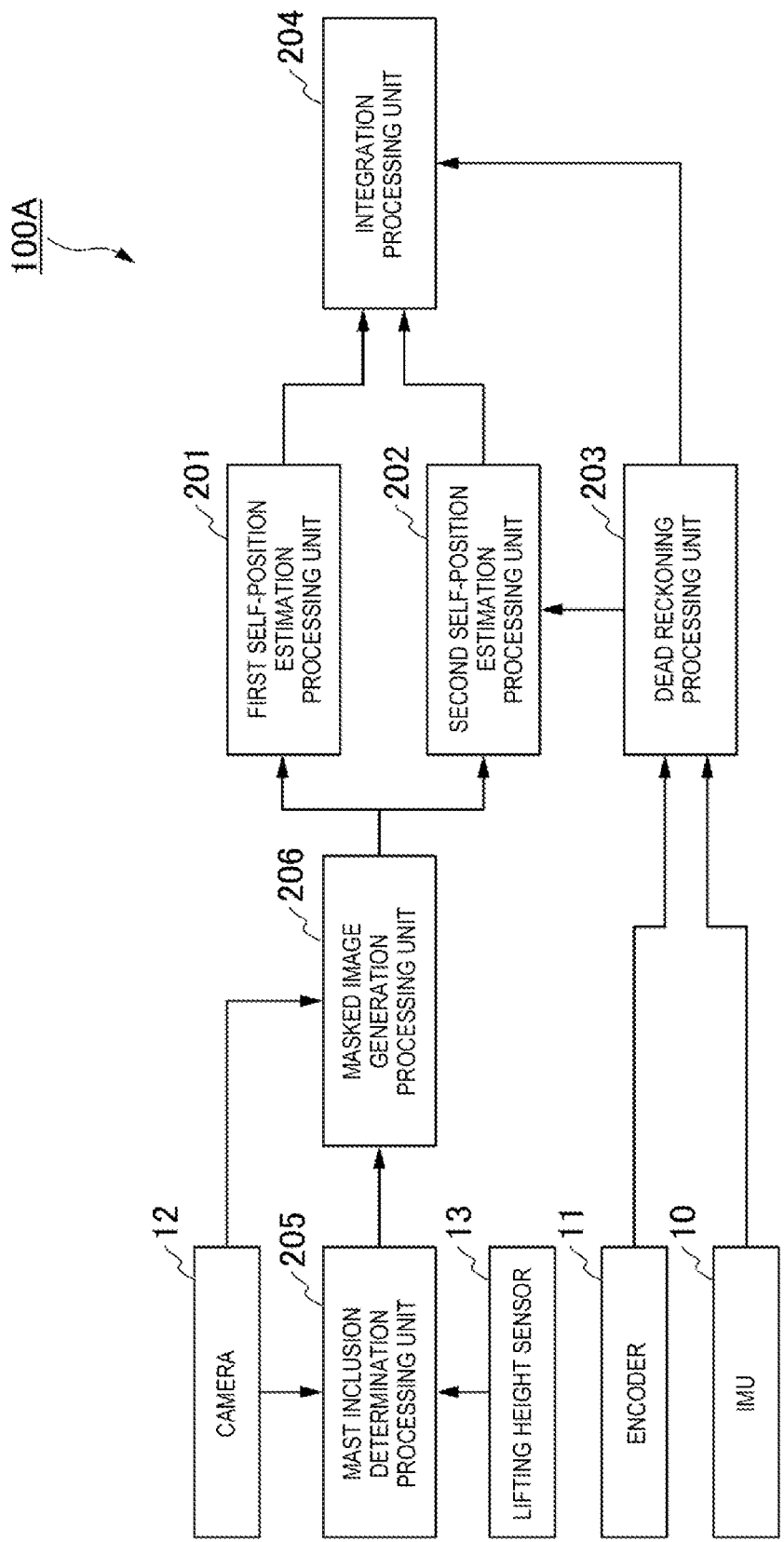
FIG. 5 is a diagram illustrating an example of a position estimation system according to a second embodiment.

FIG. 5 is a diagram illustrating an example of the position estimation system according to the second embodiment.

As illustrated in FIG. 5, the position estimation system 100A includes the first self-position estimation processing unit 201, the second self-position estimation processing unit 202, the dead reckoning processing unit 203, the integration processing unit 204, the mast inclusion determination processing unit 205, a masked image generation processing unit 206, the IMU 10, the encoder 11, the camera 12, and the lifting height sensor 13. Among these, the first self-position estimation processing unit 201, the second self-position estimation processing unit 202, the dead reckoning processing unit 203, the integration processing unit 204, the mast inclusion determination processing unit 205, and the masked image generation processing unit 206 are functions implemented in the computation device 20. In the configuration according to the second embodiment, the same reference signs are given to the same components as those of the position estimation system 100 according to the first embodiment, and the description thereof will be omitted.

When an inclusion range of the mast is allowable, the masked image generation processing unit 206 generates an image obtained by masking the inclusion range of the mast determined by the mast inclusion determination processing unit 205, outputs the generated image to the first self-position estimation processing unit 201 and the second self-position estimation processing unit 202, and instructs the execution of self-position estimation processing using an image.

Figure 6A:
FIG. 6A is a diagram for explaining masking processing according to the second embodiment.
Figure 6B:
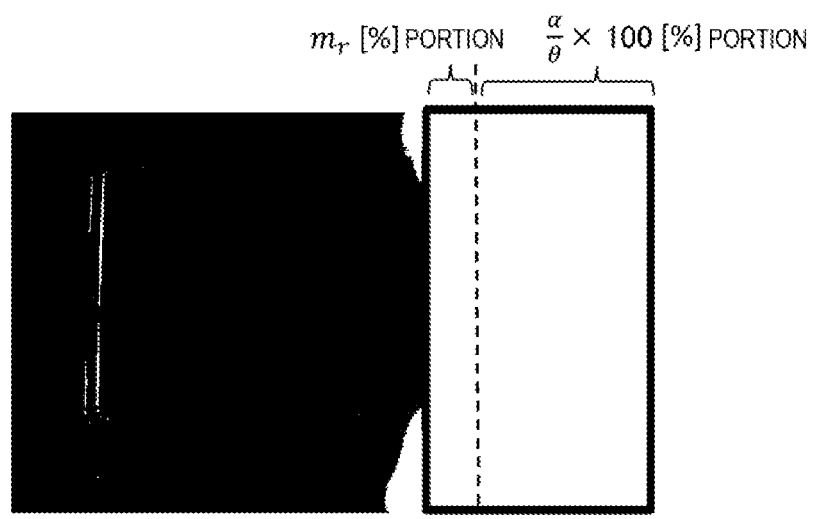
FIG. 6B is a diagram for explaining the masking processing according to the second embodiment.
Figure 7:
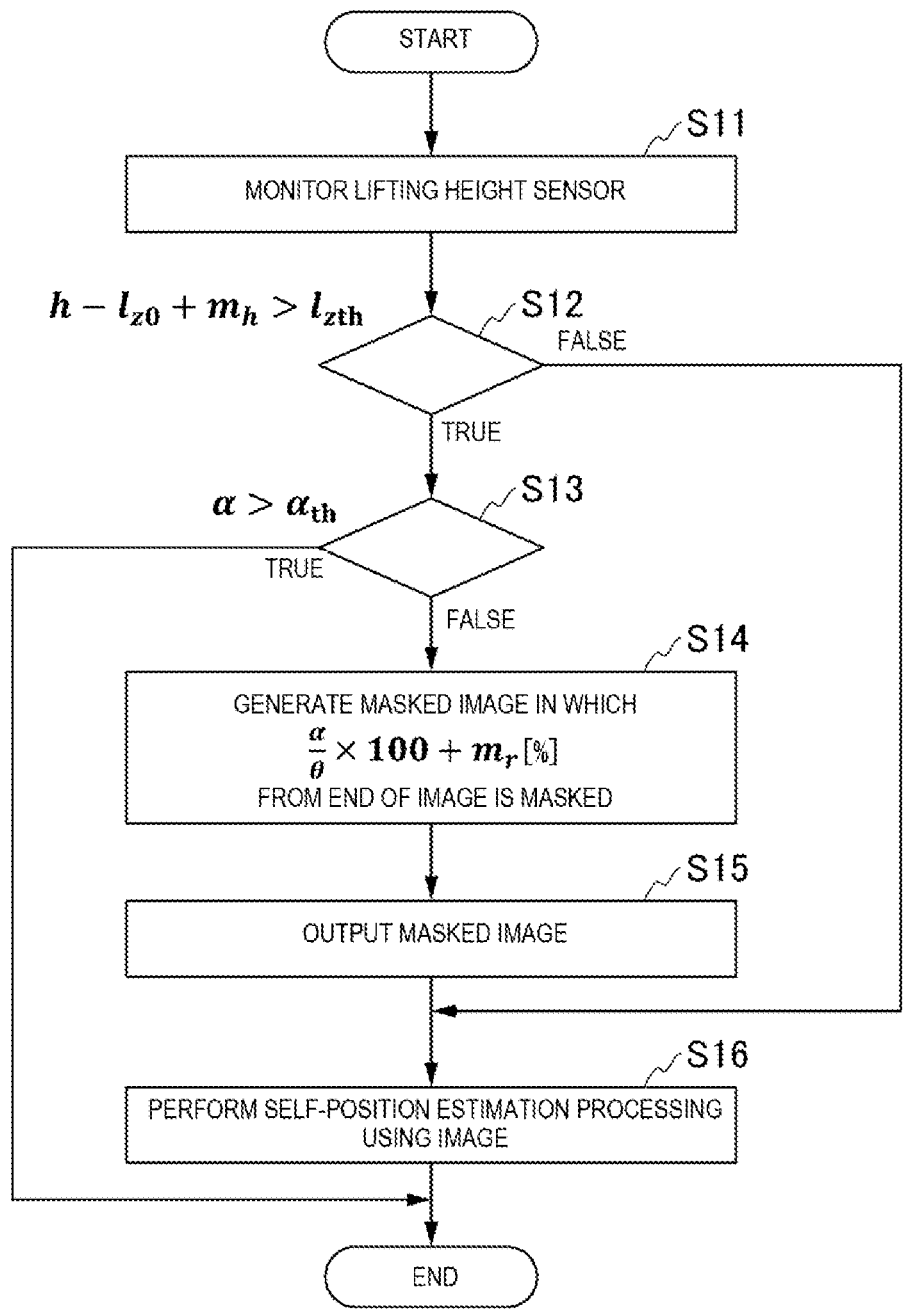
FIG. 7 is a flowchart illustrating an example of positioning processing according to the second embodiment.

FIGS. 6A and 6B are the first and the second diagrams for explaining the masking processing according to the second embodiment, respectively. FIG. 6A illustrates an example of a captured image captured by the camera 12. The mast is on the right side in this image. A range in which the mast 5 is included can be calculated by Expression (4) or Expression (7). In Expression (4) and Expression (7), θ is known, and α can be calculated from Expression (2). In Expression (2), 0, $l_x$, and $l_{z0}$ are measured at the time of installation of the camera and thus are known in advance. In Expression (2), h can be calculated from a measurement value of the lifting height sensor 13. The mast inclusion determination processing unit 205 calculates an inclusion range of the mast 5 from Expression (4) or (7) and the measurement value of the lifting height sensor 13, and outputs the calculation result with addition of a margin m r to the masked image generation processing unit 206. The masked image generation processing unit 206 generates a masked image obtained by masking the inclusion range of the mast acquired from the mast inclusion determination processing unit 205. FIG. 6B illustrates an example of the masked image. In FIG. 6B, the inclusion range of the mast is indicated in white, but any masking method may be used. For example, a black masking may be used, or an image in which the inclusion range of the mast is deleted may be generated.

Operation

Next, a flow of self-position estimation processing using an image in the positioning processing using the position estimation system 100A will be described with reference to FIG. 7. FIG. 7 is a flowchart illustrating an example of the positioning processing according to the second embodiment. The position estimation system 100A repeats the following processing at a predetermined control cycle. First, the mast inclusion determination processing unit 205 acquires a measurement value measured by the lifting height sensor 13 (step S11). Next, the mast inclusion determination processing unit 205 determines whether Expression (3') described above is satisfied (step S12). When Expression (3') is not satisfied (step S12; False), the processing proceeds to step S16. When Expression (3') is satisfied (step S12; True), the mast inclusion determination processing unit 205 calculates α (an angle corresponding to the inclusion range of the mast 5 in the image) by Expression (2), and determines whether Expression (8) below is satisfied (step S13).

$$\alpha > \alpha_{th} \quad (8)$$

Here, $\alpha_{th}$ is a threshold value for determining that the inclusion is large. When Expression (8) is satisfied (step S13; True), it is determined that the estimation accuracy of the self-position using the image is reduced, and the self-position estimation processing using an image is not executed. In this way, the reduction in the accuracy of self-position estimation is prevented and power consumption is reduced.

On the other hand, when Expression (8) is not satisfied (step S13; False), the mast inclusion determination processing unit 205 calculates an inclusion range of the mast by Expression (9) below, and outputs the value of the calculated inclusion range of the mast to the masked image generation processing unit 206.

$$(\alpha/\theta) \times 100 + m_r (\%) \quad (9)$$

Here, $m_r$ is a margin related to a masking range. The masked image generation processing unit 206 generates an image obtained by masking the inclusion range of the mast from an end of the image (step S14). The masked image generation processing unit 206 outputs the generated masked image to the first self-position estimation processing unit 201 and the second self-position estimation processing unit 202 (step S15), and instructs the execution of the self-position estimation processing using an image. The first self-position estimation processing unit 201 and the second self-position estimation processing unit 202 execute the self-position estimation processing using an unmasked range in the masked image acquired from the masked image generation processing unit 206 as a processing target (step S16), and output the estimation result to the integration processing unit 204. The result of positioning concurrently performed by the dead reckoning processing unit 203 is also output to the integration processing unit 204. The integration processing unit 204 calculates a final positioning result of a self-position from the positioning results of the first self-position estimation processing unit 201, the second self-position estimation processing unit 202, and the dead reckoning processing unit 203.

As described above, according to the present embodiment, even when the mast 5 is in a captured image, positioning is performed using a masked image as long as the inclusion range of the mast 5 is within an allowable range. This can have the positioning accuracy while avoiding the decrease in the positioning accuracy due to the inclusion of the mast 5 and unnecessary positioning processing (for example, when the mast in a large size is included in an image). Further, in performing the self-position estimation using an image, a computational load and power consumption can be reduced by not performing image processing on a masked range.

Third Embodiment

Figure 9:
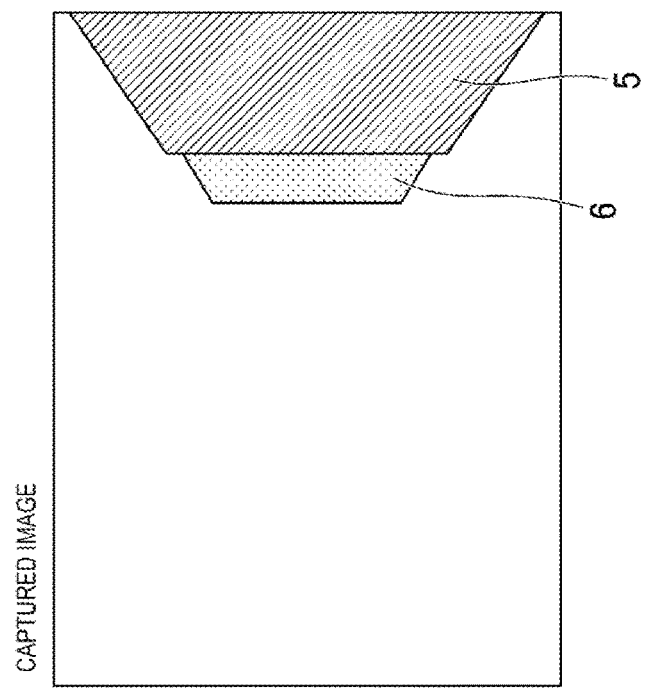
FIG. 9 is the first diagram for explaining processing of calculating a mast inclusion range according to the third embodiment.
Figure 9:
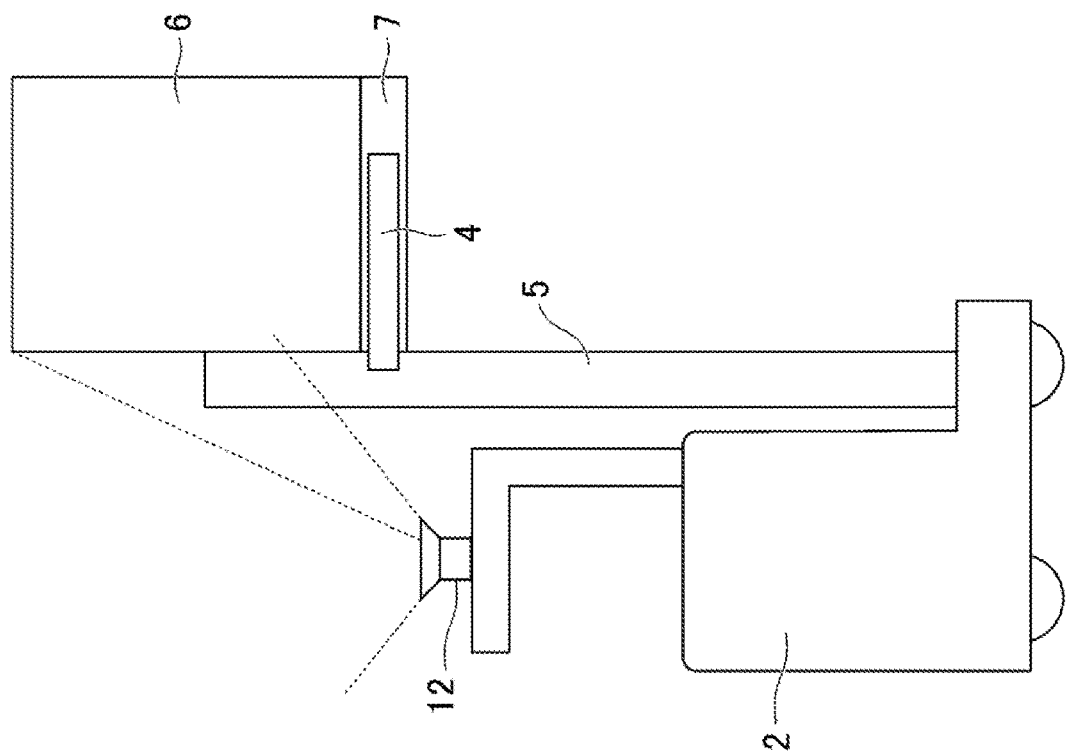
Figure 10:
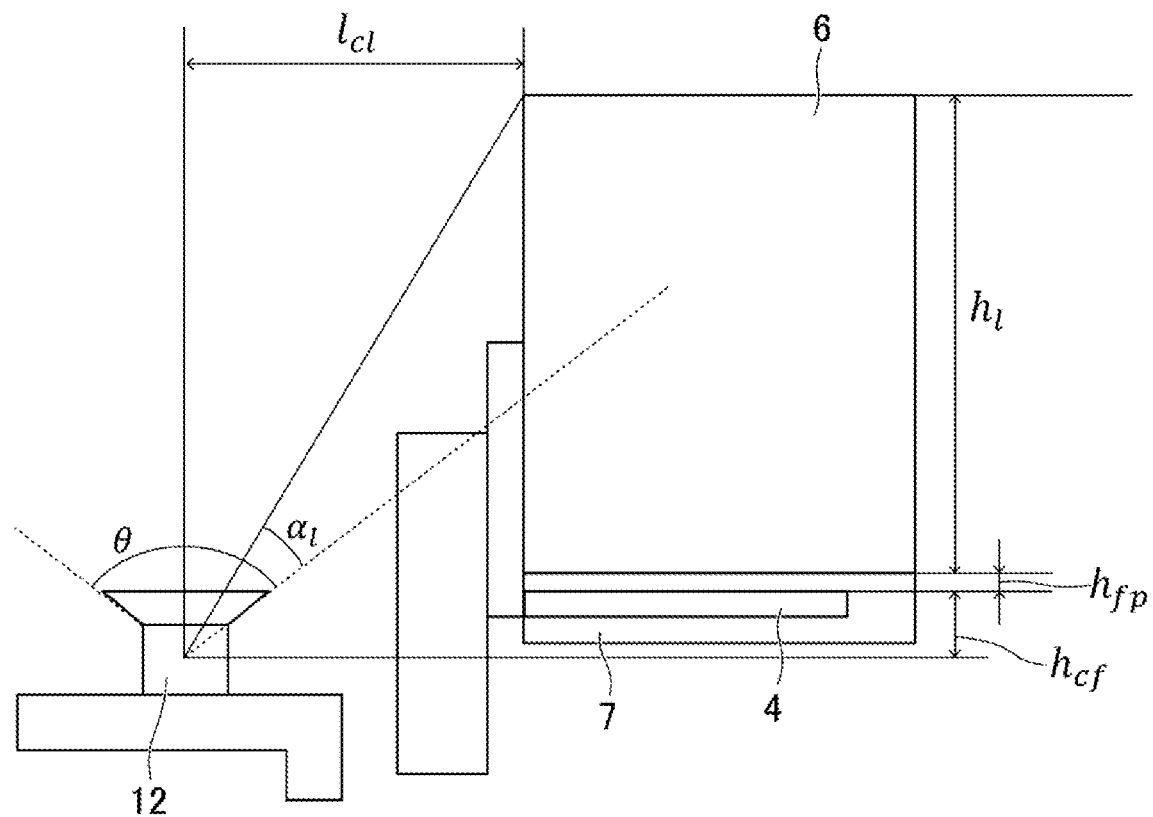
FIG. 10 is the second diagram for explaining the processing of calculating a mast inclusion range according to the third embodiment.

A position estimation system 100B according to a third embodiment of the disclosure will be described below with reference to FIGS. 8 to 10. In the first and the second embodiments, only the inclusion of the mast 5 in an image is considered, but when the lift amount of the fork 4 is large or when the height of a cargo loaded on the fork 4 is large, the cargo may also be included in the image. In the third embodiment, inclusion determination and inclusion range determination are performed in consideration of not only the mast 5 but also a cargo included in a captured image.

Configuration of Position Estimation System

Figure 8:
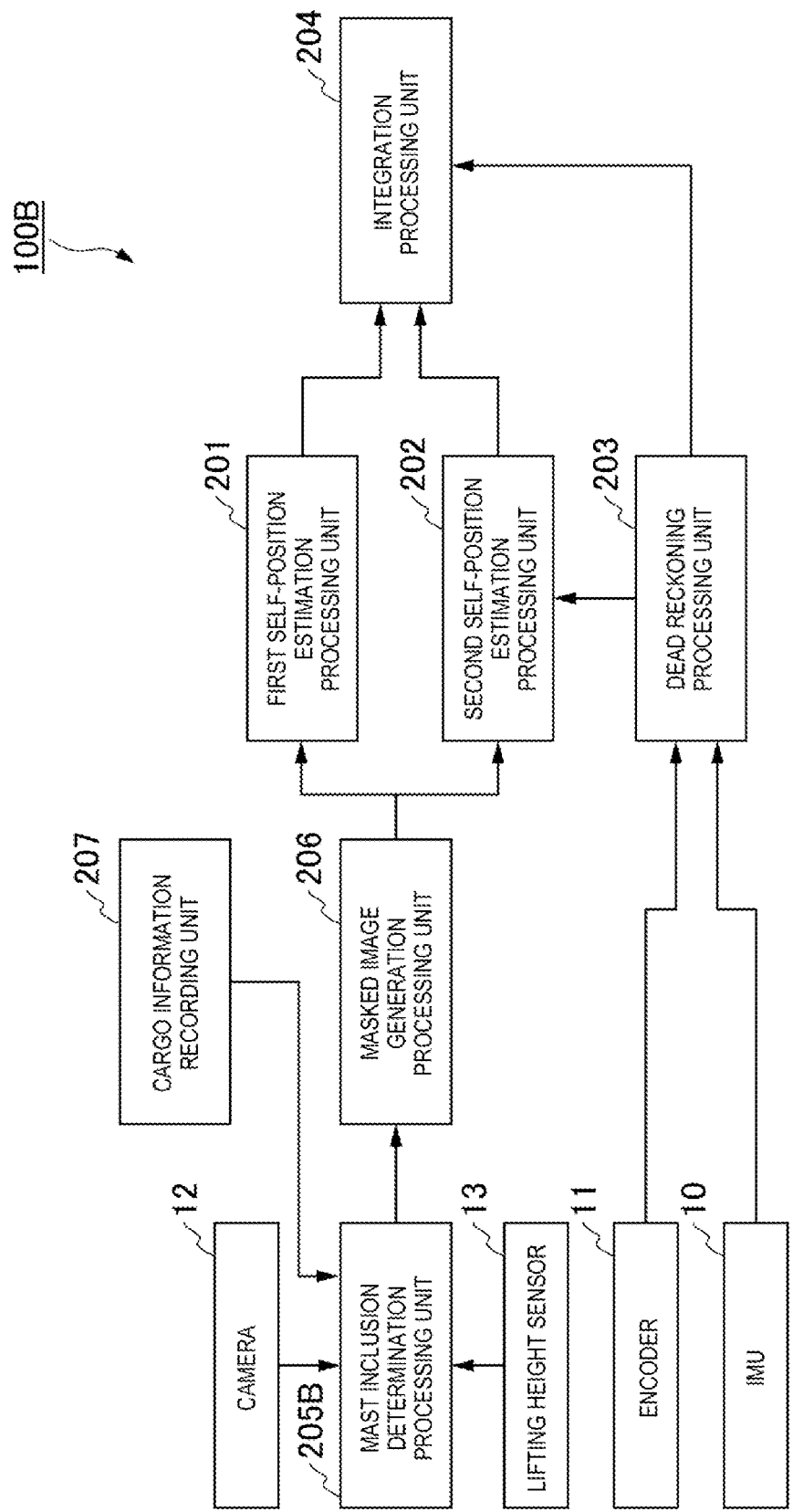
FIG. 8 is a diagram illustrating an example of a position estimation system according to a third embodiment.

FIG. 8 is a diagram illustrating an example of the position estimation system according to the third embodiment.

As illustrated in FIG. 8, the position estimation system 100B includes the first self-position estimation processing unit 201, the second self-position estimation processing unit 202, the dead reckoning processing unit 203, the integration processing unit 204, a mast inclusion determination processing unit 205B, the masked image generation processing unit 206, a cargo information recording unit 207, the IMU 10, the encoder 11, the camera 12, the lifting height sensor 13, and a load sensor 14. Among these, the first self-position estimation processing unit 201, the second self-position estimation processing unit 202, the dead reckoning processing unit 203, the integration processing unit 204, the mast inclusion determination processing unit 205B, the masked image generation processing unit 206, and the cargo information recording unit 207 are functions implemented in the computation device 20. In the configuration according to the third embodiment, the same reference signs are given to the same components as those of the position estimation system 100A according to the second embodiment, and the description thereof will be omitted.

The cargo information recording unit 207 acquires, records, and stores the height information of a cargo set from the outside. A method for setting the height information is not particularly limited. For example, in a warehouse, there may be a case in which cargoes to be handled are packed in a uniform packing style (for example, n-stacked cardboard boxes for beverages). In that case, the height information of the cargoes may be set in the cargo information recording unit 207 at the time of delivery of the cargoes or the like. Alternatively, the height information of a cargo may be set in the cargo information recording unit 207 at the time of checking the cargo by bar code scanning or the like when the cargo is picked up, in conjunction with a management system in a warehouse. In addition, the method may be such that an operator roughly sets the height information of a cargo during checking when picking-up the cargo, or an operator sets the height information of cargoes to be handled at startup of the position estimation system 100B (when handling similar packing style day by day).

The mast inclusion determination processing unit 205B geometrically calculates an inclusion range of the mast and a cargo from a lift amount of the mast, an installation position and an angle of view of the camera, the height information of the cargo, and the like, and stops the self-position estimation processing using an image when the calculation result shows that the inclusion range in the image is not allowable.

Next, a method of calculating an inclusion range of the mast and a cargo will be described with reference to FIGS. 9 and 10. FIGS. 9 and 10 are the first and the second diagrams for explaining the processing of calculating an inclusion range of the mast according to the third embodiment, respectively. FIG. 9 illustrates a state in which a cargo 6 loaded on a pallet 7 is lifted by the fork 4. As illustrated in FIG. 9, when the height of the cargo 6 is large or the lift amount of the fork 4 is large, not only the mast 5 but also the cargo 6 is included in a captured image. As illustrated in FIG. 10, when $\theta$ is an angle of view of the camera 12, $\alpha_1$ is an angle at which the cargo 6 is included in the imaging range of the camera 12, $l_{c1}$ is a distance from a camera reference position to a back surface of the cargo 6, $h_1$ is a distance from an upper surface of the pallet 7 to an upper surface of the cargo 6, $h_{cf}$ is a distance from the camera reference position to an upper surface of the fork 4 obtained from the lifting height sensor 13, and $h_{fp}$ is a distance from the upper surface of the fork 4 to the upper surface of the pallet 7, Expression (10) below is established from a geometrical relationship.

$$\alpha_1 = (\theta/2) - \tan^{-1}(l_{c1}/(h_{cf} + h_{fp} + h_1)) \quad (10)$$

A condition under which the cargo 6 is included in an image can be represented by Expression (11) below.

$$(h_{cf} + h_{fp} + h_1) > l_{c1} \cdot \tan((\pi/2) - (\theta/2)) \quad (11)$$

$h_1$ is a height of the cargo 6 and is recorded in the cargo information recording unit 207. The lengths of $l_{c1}$, $h_{cf}$, and $h_{fp}$ are also measured in advance, and recorded and stored in the mast inclusion determination processing unit 205B. The mast inclusion determination processing unit 205B acquires the height $h_1$ of the cargo 6 from the cargo information recording unit 207, and calculates an inclusion range of the mast and the cargo and a condition under which the cargo 6 is included in the image by Expression (10) and Expression (11).

Operation

Next, a flow of self-position estimation processing using an image in the positioning processing using the position estimation system 100B will be described. Both the positioning processing of the first embodiment and the positioning processing of the second embodiment can be applied to the operation of the position estimation system 100B of the third embodiment. The processing is the same as the processing described with reference to FIGS. 4 and 7 except that the mast inclusion determination processing unit 205B determines whether to perform the self-position estimation using an image in consideration of the height of the cargo 6 in addition to the height of the mast 5 (the lift amount of the fork 4) and calculates a range of masking processing in a captured image.

Processing Corresponding to First Embodiment

Whether to perform the self-position estimation using an image is determined according to the condition under which the cargo 6 is included in the image (the condition is calculated in consideration of the height of the cargo 6), and a flow of this determination processing is the same as the flow described with reference to FIG. 4 in the first embodiment. However, Expression (3') in step S2 in FIG. 4 is replaced by Expression (11') below.

$$(h_{cf} + h_{fp} + h_1) + m_h > l_{c1} \cdot \tan((\pi/2) - (\theta/2)) \quad (11')$$

The value of the margin m h may be the same as or different from that in the first embodiment.

Processing Corresponding to Second Embodiment

Processing in performing self-position estimation using an image by using a masked image is the same as the processing described with reference to FIG. 7 in the second embodiment. However, Expression (3') in step S12 in FIG. 7 is replaced by Expression (11') above, the left side of Expression in step S13 is replaced by $\alpha_1$, and a range of masking processing in step S14 is calculated by Expression (12) below.

$$(\alpha_1/\theta) \times 100 + m_r (\%) \quad (12)$$

The value of the margin m r may be the same as or different from that in the second embodiment.

Effects

As described above, according to the present embodiment, by acquiring the height information of a cargo, even when the cargo 6 as well as the mast 5 are included in an image, the inclusion range of the mast 5 and the cargo 6 can be determined, and thus the same effect as in the first embodiment or the second embodiment can be obtained. Note that the range of masking processing may be calculated in consideration of the width of the cargo 6 (a size of the cargo 6 in a depth direction in FIG. 9) in addition to the height of the cargo 6. This can reduce the range of the masking processing when the width of the cargo 6 is small, whereby a larger image range can be used for self-position estimation.

Fourth Embodiment

A position estimation system 100C according to a fourth embodiment of the disclosure will be described below with reference to FIG. 11. In the third embodiment, except for a warehouse in which almost the same packing style is commonly handled, it takes time and effort to set the height information of cargoes on a cargo-by-cargo basis. In some warehouses, there may be a case in which the contents (densities) of cargoes to be handled are the same, but the packing styles of the cargoes are different (different in the number of stacks). In that case, since each cargo is loaded on a pallet (about 1 m×1 m), the height of the cargo can be roughly estimated when density information is given. Therefore, in the fourth embodiment, a function of automatically estimating the height of a cargo by setting density information of the cargo in advance and combining the density information with a measurement value of the load sensor 14 is added.

Configuration of Position Estimation System

Figure 11:
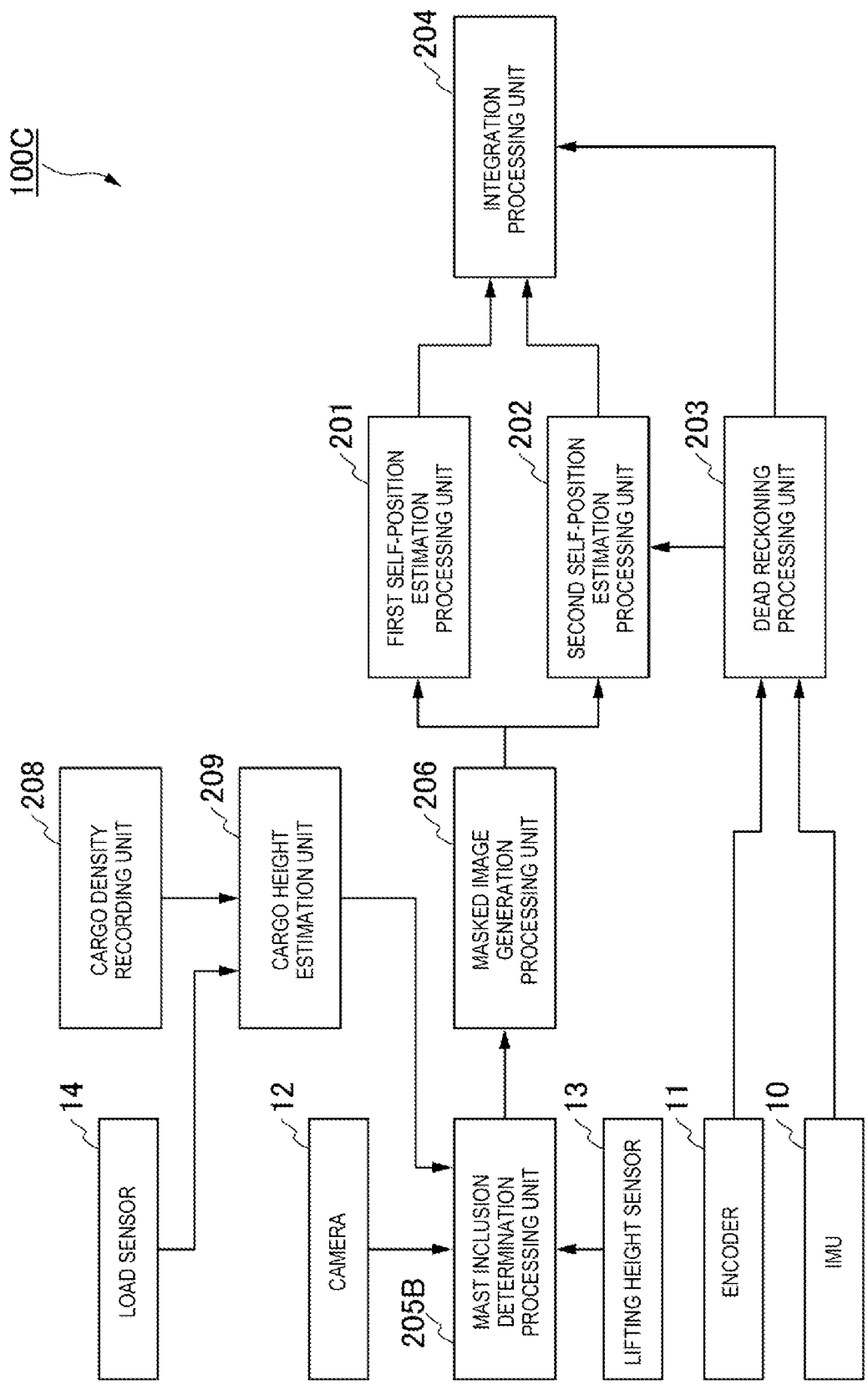
FIG. 11 is a diagram illustrating an example of a position estimation system according to a fourth embodiment.

FIG. 11 is a diagram illustrating an example of the position estimation system according to the fourth embodiment.

As illustrated in FIG. 11, the position estimation system 100C includes the first self-position estimation processing unit 201, the second self-position estimation processing unit 202, the dead reckoning processing unit 203, the integration processing unit 204, the mast inclusion determination processing unit 205B, the masked image generation processing unit 206, a cargo density recording unit 208, a cargo height estimation unit 209, the IMU 10, the encoder 11, the camera 12, the lifting height sensor 13, and the load sensor 14. Among these, the first self-position estimation processing unit 201, the second self-position estimation processing unit 202, the dead reckoning processing unit 203, the integration processing unit 204, the mast inclusion determination processing unit 205B, the masked image generation processing unit 206, the cargo density recording unit 208, and the cargo height estimation unit 209 are functions implemented in the computation device 20. In the configuration according to the fourth embodiment, the same reference signs are given to the same components as those of the position estimation system 100B according to the third embodiment, and the description thereof will be omitted.

The cargo density recording unit 208 acquires, records, and stores the density information of a cargo set from the outside.

The cargo height estimation unit 209 acquires a weight of the cargo 6 measured by the load sensor 14 and the density recorded by the cargo density recording unit 208, and estimates a height of the cargo 6. For example, the cargo height estimation unit 209 calculates a weight when cargoes each having the density recorded by the cargo density recording unit 208 are loaded on a pallet of 1 m×1 m square to a unit height, and then divides the weight of the cargo 6 measured by the load sensor 14 by the calculated weight per unit height, thereby estimating a height $h_1$ from the upper surface of the pallet 7 to the upper surface of the cargo 6 in FIG. 10.

Operation

Next, a flow of self-position estimation processing using an image in the positioning processing using the position estimation system 100C will be described. Both the positioning processing of the first embodiment and the positioning processing of the second embodiment can be applied to the operation of the position estimation system 100C of the fourth embodiment. The operation of the position estimation system 100C of the fourth embodiment is the same as the processing described in the third embodiment, except that the mast inclusion determination processing unit 205B determines whether to perform the self-position estimation using an image and calculates a range of masking processing in an captured image using the height information estimated by the cargo height estimation unit 209 instead of the height information recorded by the cargo information recording unit 207 of the third embodiment.

Effects

As described above, according to the present embodiment, it is not necessary to set the height information every time a cargo is loaded, and it is possible to estimate the height of the cargo by setting the density information in advance. Accordingly, the same effect as in the third embodiment can be obtained while a workload of an operator is reduced.

Fifth Embodiment

A position estimation system 100D according to a fifth embodiment of the disclosure will be described below with reference to FIGS. 12 and 13. For example, the mast 5 is inclined toward the vehicle body 2 side during cargo handling by the forklift 1, an inclusion range in an image is calculated in consideration of the inclination. In the first to the fourth embodiments described above, the inclusion range of the mast 5 or the like in an image is calculated by geometric calculation on the assumption that the mast 5 stands vertically, and the inclination of the mast 5 is set as a margin ($m_h$ or $m_r$) together with other error factors. However, when the margin is too large, a range in an image that can be used for the self-position estimation is narrowed, which may affect the positioning accuracy. Therefore, in the fifth embodiment, the inclusion range is more strictly calculated with reference to an inclination amount of the mast 5.

Configuration of Position Estimation System

Figure 12:
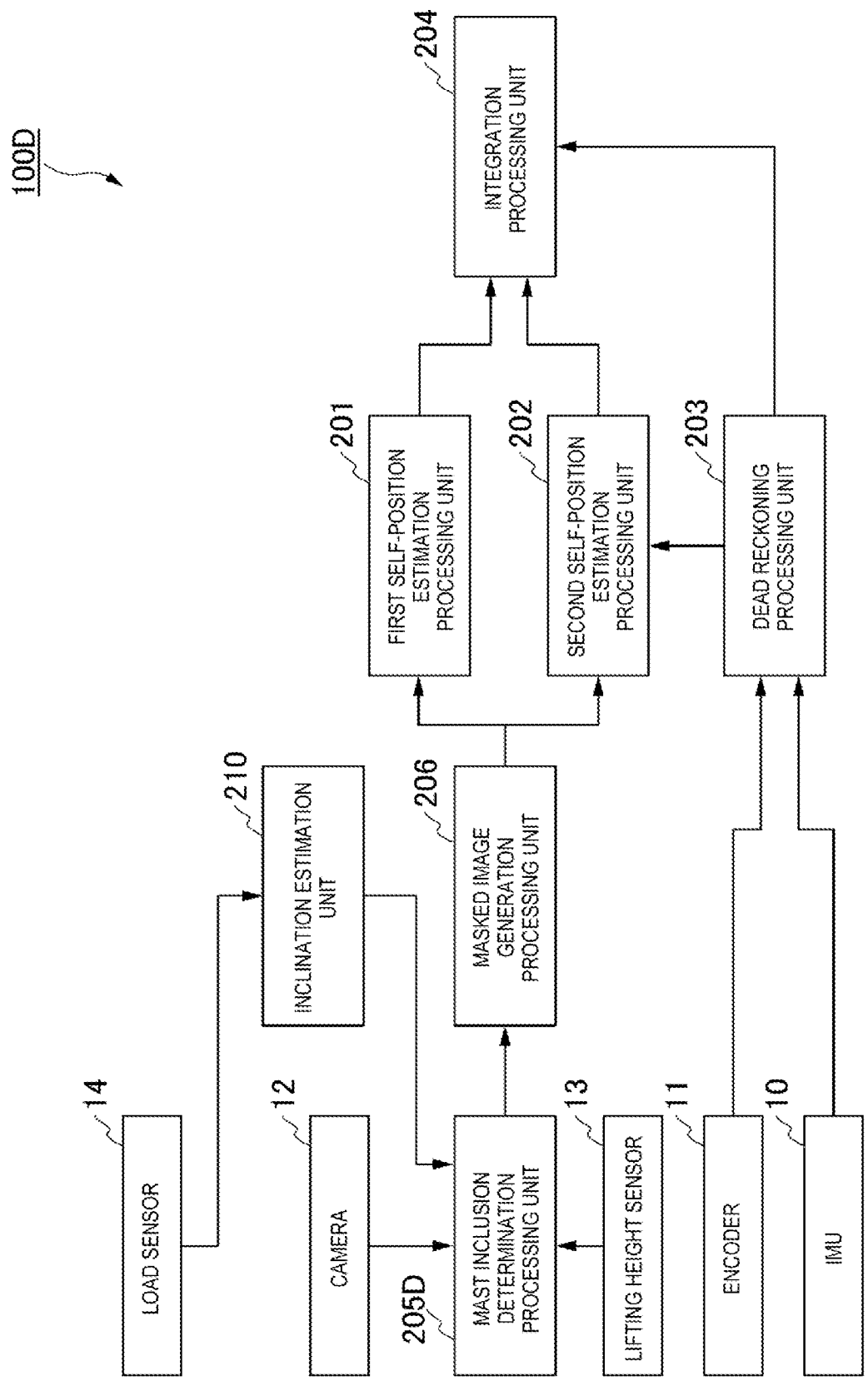
FIG. 12 is a diagram illustrating an example of a position estimation system according to a fifth embodiment.
Figure 13:
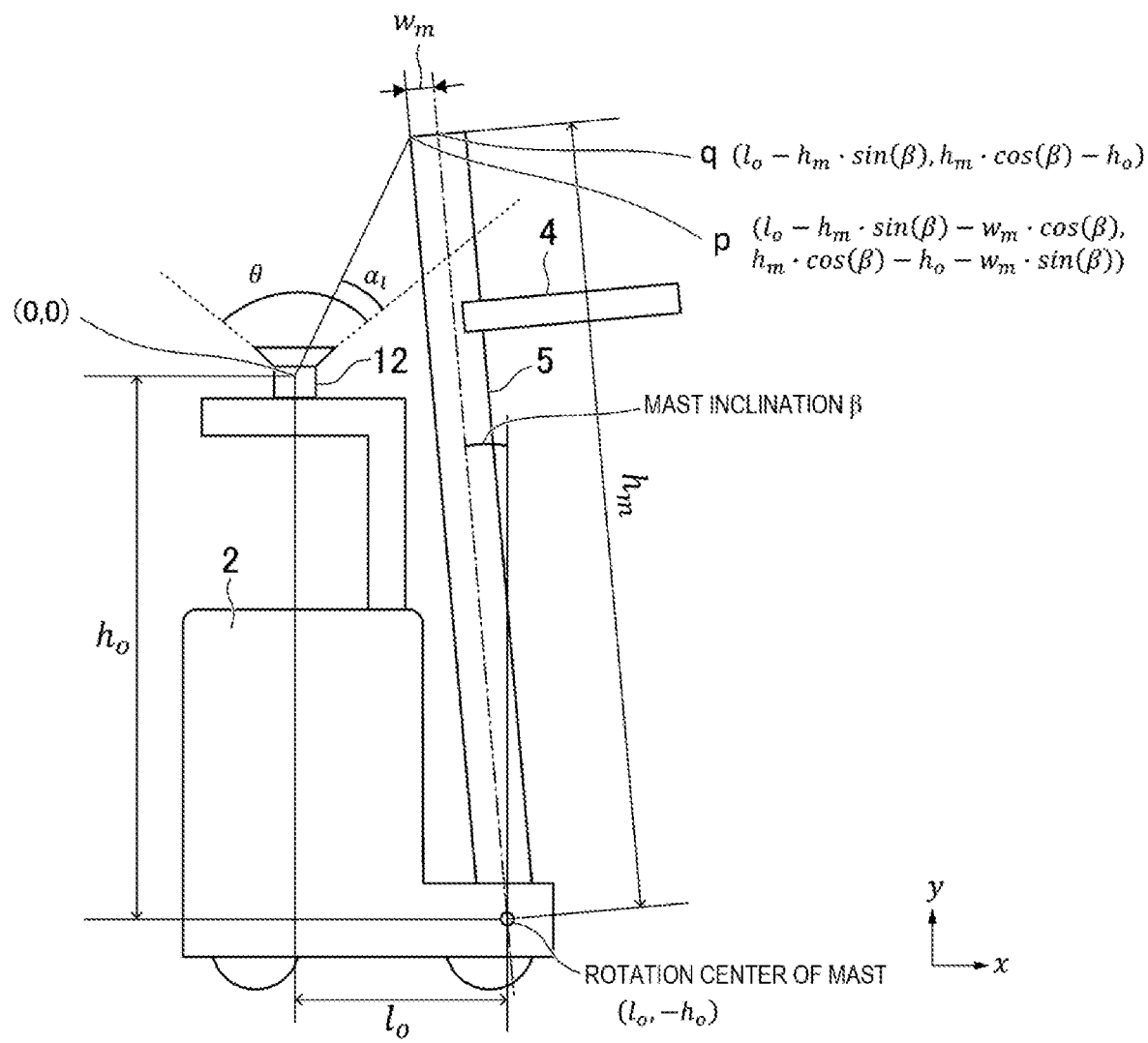
FIG. 13 is a diagram for explaining processing of calculating a mast inclusion range according to the fifth embodiment.

FIG. 12 is a diagram illustrating an example of the position estimation system according to the fifth embodiment.

As illustrated in FIG. 12, the position estimation system 100D includes the first self-position estimation processing unit 201, the second self-position estimation processing unit 202, the dead reckoning processing unit 203, the integration processing unit 204, a mast inclusion determination processing unit 205D, the masked image generation processing unit 206, an inclination estimation unit 210, the IMU 10, the encoder 11, the camera 12, the lifting height sensor 13, and the load sensor 14. Among these, the first self-position estimation processing unit 201, the second self-position estimation processing unit 202, the dead reckoning processing unit 203, the integration processing unit 204, the mast inclusion determination processing unit 205D, the masked image generation processing unit 206, and the inclination estimation unit 210 are functions implemented in the computation device 20. In the configuration according to the fifth embodiment, the same reference signs are given to the same components as those of the position estimation system 100A according to the second embodiment, and the description thereof will be omitted.

The inclination estimation unit 210 has a table or the like that defines the relationship between weights of cargoes loaded on the fork 4 and inclination amounts of the mast 5 (mast inclination angles $\beta$ illustrated in FIG. 13), and estimates an inclination amount of the mast 5 on the basis of the table and a weight of the cargo 6 measured by the load sensor 14. The estimated inclination amount is output to the mast inclusion determination processing unit 205D.

The mast inclusion determination processing unit 205D geometrically calculates an inclusion range of the mast in an image from a lift amount and the inclination amount of the mast 5, an installation position and an angle of view of the camera, and the like, and stops the self-position estimation processing using an image when the calculation result shows that the inclusion range in the image is not allowable.

Next a method of calculating an inclusion range of the mast in the present embodiment will be described with reference to FIG. 13. FIG. 13 is a diagram for explaining processing of calculating an inclusion range of the mast according to the fifth embodiment. As illustrated in FIG. 13, when $\theta$ is an angle of view of the camera 12, $\alpha_1$ is an angle at which the mast 5 is in an imaging range, $h_0$ is a height from a rotation center of the mast 5 to a camera reference point, $l_0$ is a horizontal distance from the rotation center of the mast 5 to the camera reference point, $(l_0, -h_0)$ is the coordinates of the rotation center of the mast 5, $h_m$ is a height of the mast 5, $\beta$ is an inclination angle of the mast 5 from the vertical direction, and $W_m$ is a width of the mast 5 from the rotation center of the mast 5 to the vehicle body 2 side, the coordinates of an upper end portion P of the mast 5 on the vehicle body 2 side are represented by $(l_0 - h_m \cdot \sin(\beta) - W_m \cdot \cos(\beta), h_m \cdot \cos(\beta) - h_0 - W_m \cdot \sin(\beta))$. In addition, the coordinates of an upper end portion Q corresponding to the rotation center of the mast 5 can be represented by $(l_0 - h_m \cdot \sin(\beta), h_m \cdot \cos(\beta) - h_0)$. From these relationships, Expression (12) below is established.

$$\alpha_1 = (\theta/2) - \tan^{-1}((l_0 - h_m \cdot \sin(\beta) - W_m \cdot \cos(\beta))/(h_m \cdot \cos(\beta) - h_0 - W_m \cdot \sin(\beta))) \quad (13)$$

Here, $\theta$, $l_0$, $h_m$, $W_m$, and $h_0$ are measured in advance and thus are known in advance, and these values are stored in the mast inclusion determination processing unit 205D. $\beta$ is calculated by the inclination estimation unit 210. Then, the mast inclusion determination processing unit 205D calculates a1 by Expression (13), and calculates an inclusion range of the mast by Expression (14) below, for example.

$$(\alpha_1/\theta) \times 100 + m_r'(\%) \quad (14)$$

In the present embodiment, since $\alpha_1$ is calculated in consideration of the inclination of the mast 5, the margin $m_r'$ in Expression (14) is set to a value smaller than the value set in the second embodiment. In addition, the mast inclusion determination processing unit 205D determines that the mast 5 is in an image when $\alpha_1 > 0$ is satisfied.

Operation

Next, a flow of self-position estimation processing using an image in the positioning processing using the position estimation system 100D will be described. Both the positioning processing of the first embodiment and the positioning processing of the second embodiment can be applied to the operation of the position estimation system 100D of the fifth embodiment.

Processing Corresponding to First Embodiment

Whether to perform the self-position estimation using an image is determined according to the condition under which the mast 5 is in an image, and a flow of this determination processing is the same as the flow described with reference to FIG. 4 in the first embodiment. However, Expression (3') in step S2 of FIG. 4 is replaced by $\alpha_1 > 0$.

Processing Corresponding to Second Embodiment

Processing in performing self-position estimation using an image by using a masked image is the same as the processing described with reference to FIG. 7 in the second embodiment. However, Expression (3') in step S12 in FIG. 7 is replaced by $\alpha_1 > 0$, the left side of Expression in step S13 is replaced by $\alpha_1$, and a range of masking processing in step S14 is calculated by Expression (14) above.

Effects

As described above, according to the present embodiment, by considering the inclination of the mast 5, the margin $m_r'$ of the inclusion range can be reduced, and a range in an image that can be used for the self-position estimation processing can be secured to be wider than that in the second embodiment. This can secure the accuracy of self-position estimation. Note that the present embodiment may be combined with the third embodiment and the fourth embodiment to calculate a range of masking processing in consideration of the height of a cargo. Further, although the inclination of the mast 5 is estimated from the weight of a cargo, a sensor that can measure the inclination of the mast 5 may be provided at the forklift 1 and the inclination amount of the mast 5 measured by the sensor may be used.

Sixth Embodiment

A position estimation system 100E according to a sixth embodiment of the disclosure will be described below with reference to FIGS. 14 and 16. In the first to the fourth embodiments described above, the inclusion range of the mast in an image is calculated from the geometric relationship between the mast 5 and the camera 12. In this case, it is necessary to measure the positional relationship between the camera 12 and the mast 5 at the time of installation of the camera 12, which requires time and effort at the time of introduction. Therefore, in the sixth embodiment, even if the geometric relationship between the mast 5 and the camera 12 is not measured in advance, the inclusion range of the mast is estimated from a change between an image of a ceiling captured when the vehicle body is stationary and the mast 5 is lifted and an image of the ceiling captured when the vehicle body is stationary and the fork 4 (mast 5) is lowered to the lowest position which serves as a reference. In principle, there is almost no change between captured images when the vehicle body is stopped. Thus, it is possible to easily estimate the range in which the mast 5 and the cargo 6 are included in an image captured while the vehicle body is stationary and the mast 5 is being lifted by observing a difference from an image captured immediately after the stationary state of the vehicle body is started. By learning the correspondence relationship between determined inclusion ranges and the heights of the mast 5, an inclusion range can be estimated from the height of the mast 5.

Configuration of Position Estimation System

Figure 14:
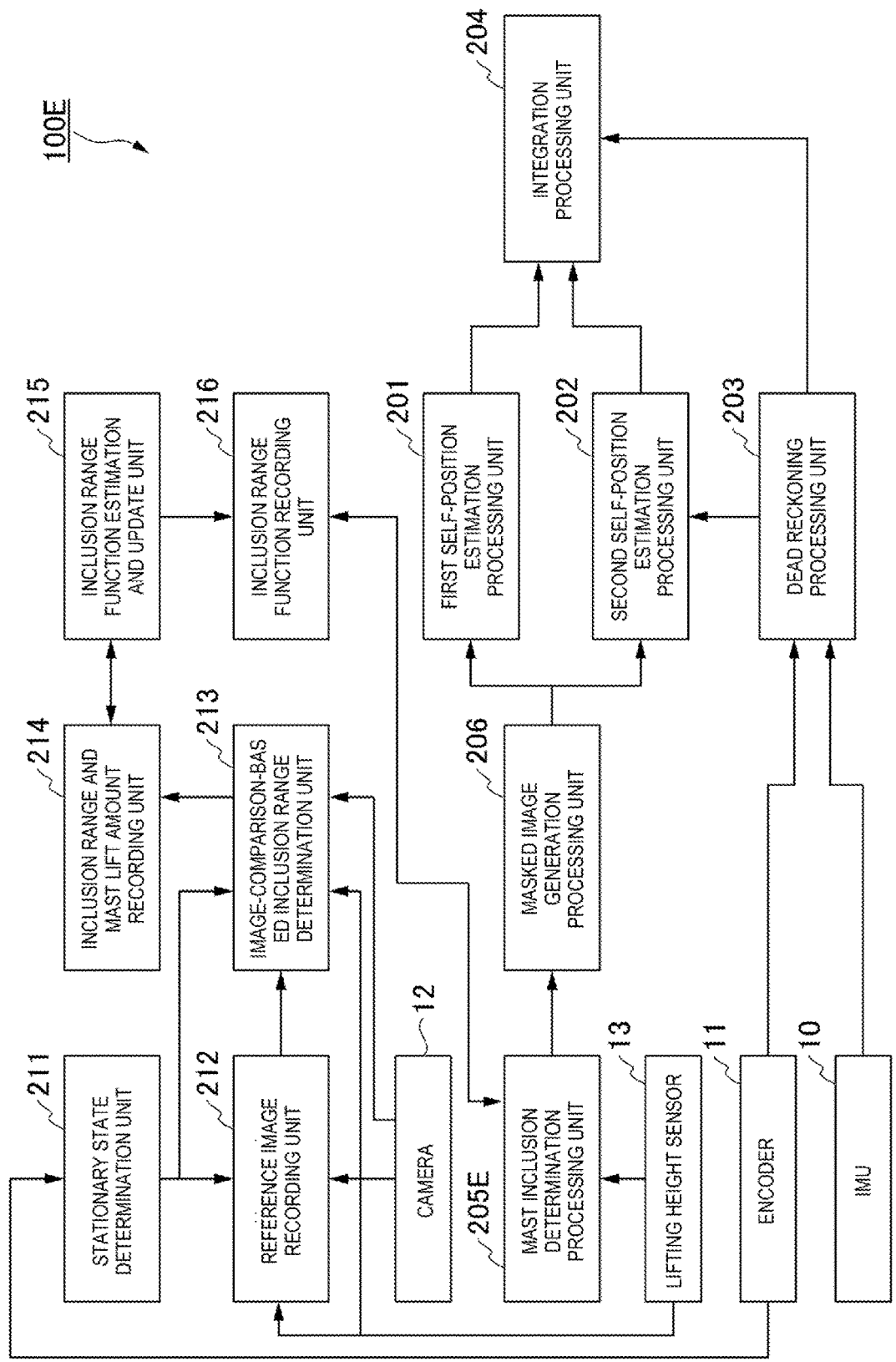
FIG. 14 is a diagram illustrating an example of a position estimation system according to a sixth embodiment.

FIG. 14 is a diagram illustrating an example of the position estimation system according to the sixth embodiment.

As illustrated in FIG. 14, the position estimation system 100E includes the first self-position estimation processing unit 201, the second self-position estimation processing unit 202, the dead reckoning processing unit 203, the integration processing unit 204, the mast inclusion determination processing unit 205E, the masked image generation processing unit 206, a stationary state determination unit 211, a reference image recording unit 212, an image-comparison-based inclusion range determination unit 213, an inclusion range and mast lift amount recording unit 214, an inclusion range function estimation and update unit 215, an inclusion range function recording unit 216, the IMU 10, the encoder 11, the camera 12, and the lifting height sensor 13. Among these, the first self-position estimation processing unit 201, the second self-position estimation processing unit 202, the dead reckoning processing unit 203, the integration processing unit 204, the mast inclusion determination processing unit 205E, the masked image generation processing unit 206, the stationary state determination unit 211, the reference image recording unit 212, the image-comparison-based inclusion rage determination unit 213, the inclusion range and mast lift amount recording unit 214, the inclusion range function estimation and update unit 215, and the inclusion range function recording unit 216 are functions implemented in the computation device 20. In the configuration according to the sixth embodiment, the same reference signs are given to the same components as those of the position estimation system 100A according to the second embodiment, and the description thereof will be omitted.

The stationary state determination unit 211 determines that the forklift 1 is in a stationary state when the vehicle speed is near 0 on the basis of the measurement value of the encoder 11.

The reference image recording unit 212 acquires an image captured by the camera 12 when the stationary state determination unit 211 determines the stationary state and the height of the fork 4 (the height of the mast 5) measured by the lifting height sensor 13 is at the lowest position, and records and stores the acquired image as a reference image.

The image-comparison-based inclusion range determination unit 213 acquires an image captured by the camera 12 when the stationary state determination unit 211 determines the stationary state and the height of the fork 4 measured by the lifting height sensor 13 is at other than the lowest position, obtains a difference between the acquired image and the reference image, and determines a range in which the difference is large as the inclusion range of the mast and the like (including not only the mast 5, but also a cargo). The image-comparison-based inclusion range determination unit 213 outputs, to the inclusion range and mast lift amount recording unit 214, the measurement value obtained by the lifting height sensor 13 when the acquired image was captured and the determined inclusion range in association with each other.

The inclusion range and mast lift amount recording unit 214 calculates a lift amount of the mast from the measurement value from the lifting height sensor 13 acquired from the image-comparison-based inclusion range determination unit 213, and records and stores a set of the inclusion range of the mast and the like and the calculated lift amount of the mast. In addition, when the number of the recorded sets exceeds a predetermined number, the inclusion range and mast lift amount recording unit 214 preferentially deletes overlapping data in chronological order.

When a sufficient number of sets of the inclusion range of the mast and the like and the lift amount of the mast is accumulated in the inclusion range and mast lift amount recording unit 214, the inclusion range function estimation and update unit 215 estimates a function indicating the relationship between the inclusion range of the mast and the like and the lift amount of the mast, and outputs the obtained estimation function to the inclusion range function recording unit 216. This estimation function is a function that outputs an inclusion range of the mast and the like when a lift amount of the mast is input. The inclusion range function estimation and update unit 215 compares an inclusion range newly recorded in the inclusion range and mast lift amount recording unit 214 after the estimation of the estimation function with an inclusion range estimated using a lift amount of the mast newly recorded in the inclusion range and mast lift amount recording unit 214 and the estimation function, and when the difference between the inclusion ranges exceeds a reference, determines to update the estimation function. When the estimation function is determined to be updated, the inclusion range function estimation and update unit 215 updates the estimation function by estimating again a function indicating the relationship between the inclusion range and the lift amount of the mast using the set of the newly recorded inclusion range and the lift amount of the mast. The updated estimation function is output to the inclusion range function recording unit 216. For example, when the forklift 1 moves and the positional relationship between the light source and the camera 12 changes, the range in which the field of view is blocked by the mast 5 included in an image captured by the camera 12 may seem to have been changed even when the lift amount of the mast 5 has not been changed. In that case, the estimation function is updated.

The inclusion range function recording unit 216 records and stores the estimation function of the inclusion range.

The mast inclusion determination processing unit 205E acquires a measurement value measured by the lifting height sensor 13, and calculates a lift amount of the mast 5, for example, by subtracting, from the acquired measurement value, a measurement value measured by the lifting height sensor 13 when the fork 4 is at the lowest position. The mast inclusion determination processing unit 205E inputs the calculated lift amount of the mast 5 to the estimation function stored in the inclusion range function recording unit 216 to calculate an inclusion range of the mast and the like. When the inclusion range of the mast and the like based on the estimation function is not allowable, the self-position estimation processing using an image is stopped.

Figure 15:
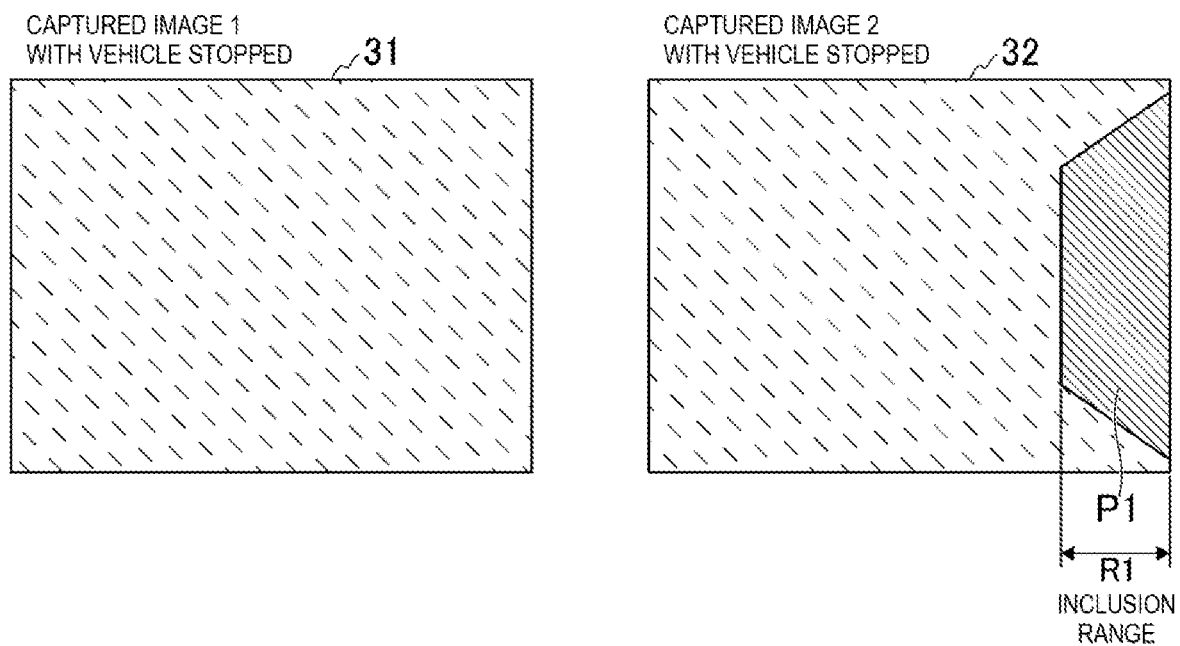
FIG. 15 is the first diagram for explaining processing of calculating a mast inclusion range according to the sixth embodiment.
Figure 16:
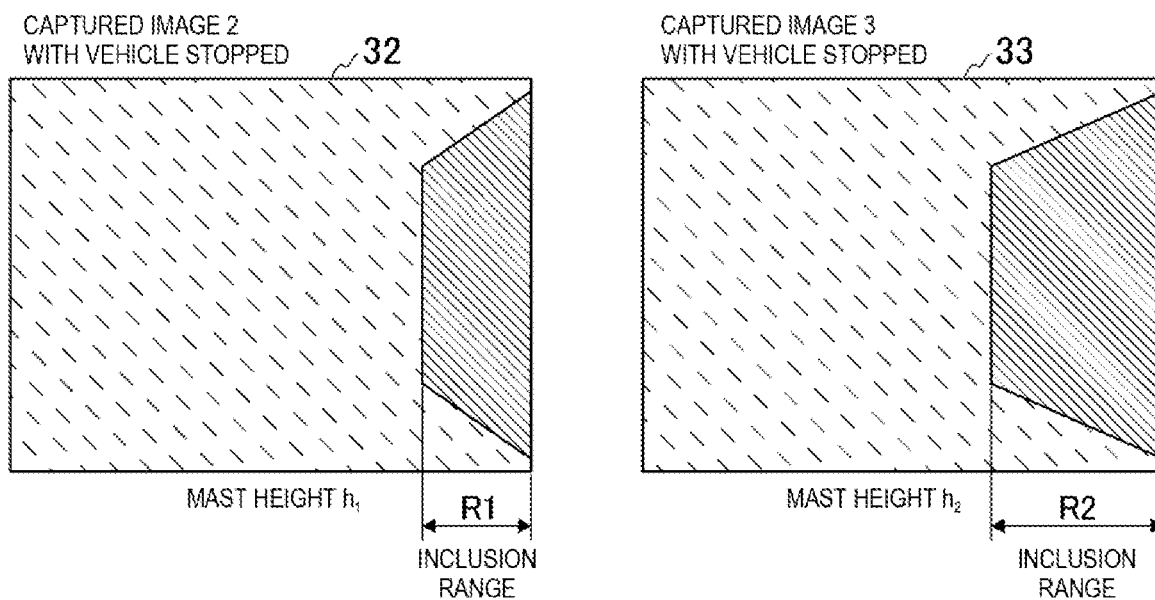
FIG. 16 is the second diagram for explaining the processing of calculating a mast inclusion range according to the sixth embodiment.

FIGS. 15 and 16 are the first and the second diagrams for explaining the processing of estimating an inclusion range of the mast according to the sixth embodiment, respectively.

As illustrated in FIG. 15, the image-comparison-based inclusion range determination unit 213 compares a reference image 150 captured when the forklift 1 is stopped with an image 151 captured when the forklift 1 is stopped and the mast 5 is lifted, determines a portion P1 in which a difference in a pixel value exceeds a predetermined value, and determines an inclusion range of the mast and the like from the portion P1 (for example, a range of a distance R1 from the right end of the image in FIG. 15). Then, as illustrated in FIG. 16, the inclusion range and mast lift amount recording unit 214 records a set of an inclusion range of the mast and the like defined by the distance R1 and a lift amount h1 of the mast, and records a set of an inclusion range of the mast and the like defined by a distance R2 and a lift amount h2 of the mast.

Operation

Next, a flow of self-position estimation processing using an image in the positioning processing using the position estimation system 100E will be described. Both the positioning processing of the first embodiment and the positioning processing of the second embodiment can be applied to the operation of the position estimation system 100E of the sixth embodiment.

Processing Corresponding to First Embodiment

Whether to perform the self-position estimation using an image is determined according to the condition under which the mast 5 is in an image, and a flow of this determination processing is the same as the flow described with reference to FIG. 4 in the first embodiment. However, for example, Expression (3') in step S2 in FIG. 4 is replaced by (an inclusion range of the mast and the like calculated on the basis of the estimation function)>(a predetermined first threshold value).

Processing Corresponding to Second Embodiment

Processing in performing self-position estimation using an image by using a masked image is the same as the processing described with reference to FIG. 7 in the second embodiment. However, for example, Expression (3') in step 12 in FIG. 7 is replaced by (an inclusion range of the mast and the like calculated on the basis of the estimation function)>(the predetermined first threshold value), the expression in step S13 is replaced by (an inclusion range of the mast and the like calculated on the basis of the estimation function)>(a predetermined second threshold) (the second threshold>the first threshold value), and the expression for obtaining a range of masking processing in step S14 is replaced by Expression (15) below.

$$(\text{An inclusion range of the mast and the like calculated on the basis of the estimation function}/\text{total area of an image}) \times 100 + m_r''(\%) \quad (15)$$

$m_r''$ is any margin.

Effects

As described above, according to the present embodiment, since there is no need to measure and set the geometric relationship between the mast 5 and the camera 12 in advance, it is possible to reduce a work time and a work cost associated with the introduction of the position estimation system 100E. Note that an inclination amount of the mast 5 may be calculated by the method described in the fifth embodiment, an estimation function indicating the relationship between the inclination amount of the mast 5, the lift amount of the mast 5, and the inclusion range of the mast and the like may be generated, and an inclusion range of the mast and the like may be calculated by inputting an inclination amount of the mast 5 and a lift amount of the mast 5.

Figure 17:
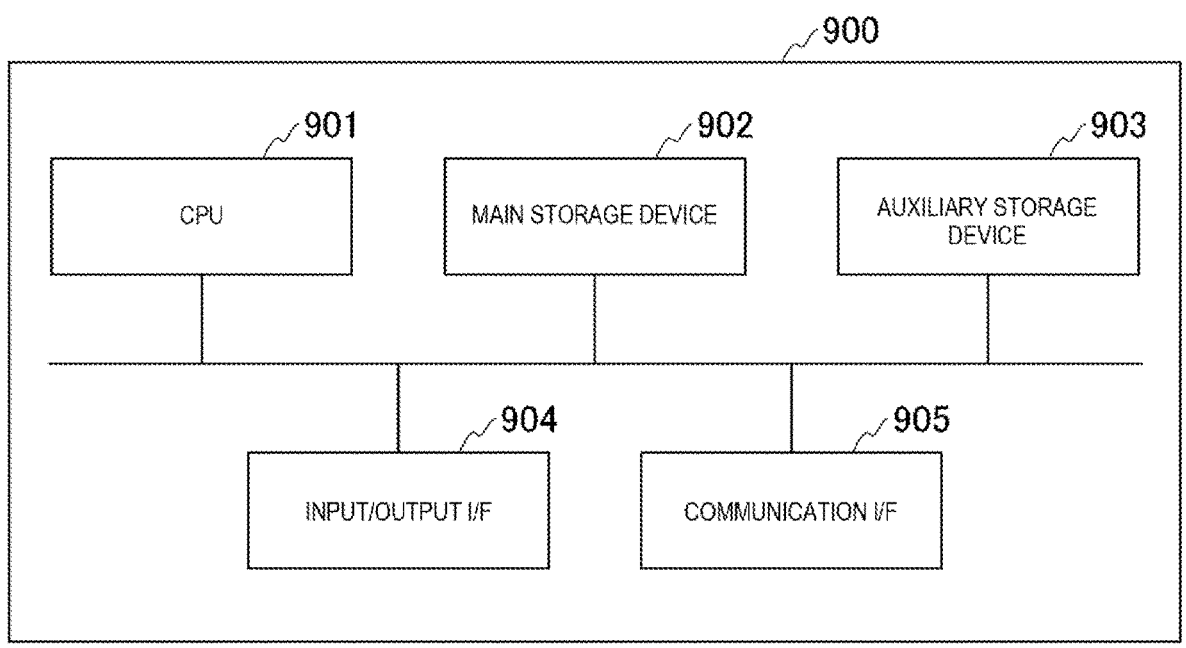
FIG. 17 is a diagram illustrating an example of a hardware configuration of the position estimation system according to each embodiment.

FIG. 17 is a diagram illustrating an example of a hardware configuration of the position estimation system according to each embodiment.

A computer 900 includes a CPU 901, a main storage device 902, an auxiliary storage device 903, an input/output interface 904, and a communication interface 905. The computation device 20 described above is implemented in the computer 900. The functions described above are stored in the auxiliary storage device 903 in a format of a program. The CPU 901 reads the program from the auxiliary storage device 903, develops the program to the main storage device 902, and executes the above-mentioned processing in accordance with the program. The CPU 901 secures a storage area in the main storage device 902 in compliance with the program. The CPU 901 secures a storage area for storing data under processing in the auxiliary storage device 903 in compliance with the program.

Processing of each functional unit may be performed by recording a program for implementing all or some of the functions of the computation device 20 in a computer-readable recording medium and causing the program recorded in this recording medium to be read into a computer system and the program to be executed. The "computer system" here includes hardware such as an operating system (OS) or peripheral equipment. In addition, if a world wide web (WWW) system is used, the "computer system" also includes a home page providing environment (or a display environment). The "computer readable recording medium" refers to a portable medium such as a CD, a DVD, or a USB, or a storage device such as a hard disk built in a computer system. Further, when this program is distributed to the computer 900 through a communication line, the computer 900 receiving the distribution may develop the program to the main storage device 902, and may execute the above-mentioned processing. The above-described program may implement part of the functions described above, and furthermore, also implement the functions described above in combination with a program already recorded in the computer system.

In the foregoing, certain embodiments of the disclosure have been described, but all of these embodiments are merely illustrative and are not intended to limit the scope of the disclosure. These embodiments may be implemented in various other forms, and various omissions, substitutions, and alterations may be made without departing from the gist of the disclosure. These embodiments and modifications are included in the scope and gist of the disclosure and are also included in the scope of the disclosure described in the claims and equivalents thereof.

Supplementary Notes

The position estimation system, the forklift, the position estimation method, and the program described in each of the embodiments can be understood as follows, for example.

(1) Each of position estimation systems 100 to 100E according to a first aspect is a position estimation system for estimating a position of a forklift 1 equipped with a camera 12 and includes: a position estimation unit (a first self-position estimation processing unit 201 and a second self-position estimation processing unit 202) configured to estimate a position of the forklift 1 on the basis of a feature included in an image captured by the camera 12; and an inclusion determination unit (mast inclusion determination processing unit 205, 205B, 205E) configured to calculate, on the basis of a position in a height direction of a mast with which the forklift is equipped, an inclusion range indicating a range in which the mast is in the image and determine to stop estimation of the position by using the position estimation unit when the inclusion range calculated exceeds an allowable range (steps S2 and S13).

Accordingly, it is possible to secure the accuracy of the self-position estimation processing and reduce power consumption.

(2) A position estimation system according to a second aspect is the position estimation system of (1) and further includes an image processing unit (masked image generation processing unit 206) configured to perform processing of excluding the inclusion range from the image when the inclusion range is within the allowable range. The position estimation unit estimates the position on the basis of the image after the processing of excluding is performed.

This shortens the processing interval of the self-position estimation processing using an image and thus can prevent the reduction in the estimation accuracy.

(3) A position estimation system according to a third aspect is the position estimation system of (1) or (2) and further includes a cargo information acquisition unit (cargo information recording unit 207) configured to acquire height information of a cargo to be loaded on the forklift. The inclusion determination unit calculates the inclusion range on the basis of the position in the height direction of the mast and the height information of the cargo.

Accordingly, it is possible to calculate the inclusion range of the mast and the cargo in consideration of the inclusion of not only the mast but also the cargo.

(4) A position estimation system according to a fourth aspect is the position estimation system according to (3) and further includes a height estimation unit configured to estimate the height information of the cargo on the basis of a density of the cargo, an area of a loading surface when the cargo is loaded on the forklift, and a weight of the cargo.

Accordingly, it is possible to calculate the inclusion range of the mast and the cargo with no need to set the height of the cargo.

(5) A position estimation system according to a fifth aspect is the position estimation system of any one of (1) to (4). The inclusion determination unit calculates the inclusion range on the basis of the position in the height direction of the mast and an inclination of the mast.

Accordingly, it is possible to calculate the inclusion range of the mast in consideration of the inclination of the mast.

(6) A position estimation system according to a sixth aspect is the position estimation system of any one of (1) to (5). The inclusion determination unit calculates the inclusion range on the basis of a geometrical relationship between height positions of the camera and the mast.

Accordingly, it is possible to calculate the inclusion range of the mast only by setting the positional relationship between the camera and the mast.

(7) A position estimation system according to a seventh aspect is the position estimation system according to any one of (1) to (6) and further includes a function estimation unit configured to calculate the inclusion range according to each height position of the mast from a difference between the image captured when the forklift is stopped and the mast is at a lowest position and the image captured when the forklift is stopped and the mast is at various positions and calculate an estimation function defining a relationship between the height of the mast and the inclusion range, wherein the inclusion determination unit calculates the inclusion range on the basis of the height position of the mast and the estimation function.

Accordingly, it is possible to calculate the inclusion range of the mast only by image processing with no need to set the positional relationship between the camera and the mast.

(8) A forklift according to an eighth aspect includes a position estimation system of (1) to (7) and a camera.

(9) A position estimation method according to a ninth aspect is a position estimation method for estimating a position of a forklift equipped with a camera and includes: calculating, on the basis of a position in a height direction of a mast with which the forklift is equipped, an inclusion range indicating a range in which the mast is in an image captured by the camera; determining whether the inclusion range calculated exceeds an allowable range; and determining to stop processing of estimating a position of the forklift on the basis of a feature included in the image captured by the camera when the inclusion range exceeds the allowable range.

(10) A program according to a tenth aspect causes a computer to execute processing of estimating a position of a forklift equipped with a camera. The processing includes: calculating, on the basis of a position in a height direction of a mast with which the forklift is equipped, an inclusion range indicating a range in which the mast is in an image captured by the camera; determining whether the inclusion range calculated exceeds an allowable range; and determining to stop the processing of estimating a position of the forklift on the basis of a feature included in the image captured by the camera when the inclusion range exceeds the allowable range.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A position estimation system for estimating a position of a forklift equipped with a camera, the position estimation system comprising:
 a position estimation unit configured to estimate a position of the forklift on the basis of a feature included in an image captured by the camera; and
 an inclusion determination unit configured to calculate, on the basis of a position in a height direction of a mast with which the forklift is equipped, an inclusion range indicating a range in which the mast is in the image and determine to stop estimation of the position by using the position estimation unit when the inclusion range calculated exceeds an allowable range.

2. The position estimation system according to claim 1, further comprising
 an image processing unit configured to perform processing of excluding the inclusion range from the image when the inclusion range is within the allowable range,
 wherein the position estimation unit estimates the position on the basis of the image after the processing of excluding is performed.

3. The position estimation system according to claim 1, further comprising
 a cargo information acquisition unit configured to acquire height information of a cargo to be loaded on the forklift,
 wherein the inclusion determination unit calculates the inclusion range on the basis of the position in the height direction of the mast and the height information of the cargo.

4. The position estimation system according to claim 3, further comprising
 a height estimation unit configured to estimate the height information of the cargo on the basis of a density of the cargo, an area of a loading surface when the cargo is loaded on the forklift, and a weight of the cargo.

5. The position estimation system according to claim 1, wherein the inclusion determination unit calculates the inclusion range on the basis of the position in the height direction of the mast and an inclination of the mast.

6. The position estimation system according to claim 1, wherein the inclusion determination unit calculates the inclusion range on the basis of a geometrical relationship between height positions of the camera and the mast.

7. The position estimation system according to claim 1, further comprising
 a function estimation unit configured to calculate the inclusion range according to each height position of the mast from a difference between the image captured when the forklift is stopped and the mast is at a lowest position and the image captured when the forklift is stopped and the mast is at various positions and calculate an estimation function defining a relationship between a height of the mast and the inclusion range,
 wherein the inclusion determination unit calculates the inclusion range on the basis of the height position of the mast and the estimation function.

8. A forklift, comprising:
 a camera; and
 the position estimation system described in claim 1.

9. A position estimation method for estimating a position of a forklift equipped with a camera, the position estimation method comprising:
 calculating, on the basis of a position in a height direction of a mast with which the forklift is equipped, an inclusion range indicating a range in which the mast is in an image captured by the camera;
 determining whether the inclusion range calculated exceeds an allowable range; and
 determining to stop processing of estimating a position of the forklift on the basis of a feature included in the image captured by the camera when the inclusion range exceeds the allowable range.

10. A non-transitory computer readable storage medium storing a program causing a computer to execute a position estimation method for estimating a position of a forklift equipped with a camera, the position estimation method comprising:
 calculating, on the basis of a position in a height direction of a mast with which the forklift is equipped, an inclusion range indicating a range in which the mast is in an image captured by the camera;
 determining whether the inclusion range calculated exceeds an allowable range; and
 determining to stop processing of estimating a position of the forklift on the basis of a feature included in the image captured by the camera when the inclusion range exceeds the allowable range.

* * * * *